(12) United States Patent
Voroba et al.

(10) Patent No.: US 6,311,071 B1
(45) Date of Patent: Oct. 30, 2001

(54) LOW-FEEDBACK COMPACT WIRELESS TELEPHONE

(75) Inventors: Barry Voroba, Minnetonka; Daniel E. Kobylarz, Bloomington; Carrie L. Zochert, Minnetonka; Steven Maser, Hinckley; Marlyn J. Anderson, St. Louis Park, all of MN (US)

(73) Assignee: MicroTalk Technologies, Inc., Minnetonka, MN (US)

(*) Notice: Subject to any disclaimer, the term of this patent is extended or adjusted under 35 U.S.C. 154(b) by 0 days.

(21) Appl. No.: 09/585,110

(22) Filed: Jun. 1, 2000

Related U.S. Application Data

(62) Division of application No. 09/166,661, filed on Oct. 5, 1998, now Pat. No. 6,091,965, which is a division of application No. 08/262,735, filed on Jun. 20, 1994, now Pat. No. 5,819,183.

(51) Int. Cl.⁷ .................................................. H04Q 7/20
(52) U.S. Cl. ......................... 455/550; 455/90; 455/575; 455/569
(58) Field of Search .................................. 455/550, 575, 455/40, 556, 569, 570; 379/428, 432; 368/10, 13; 381/83, 92, 93, 155, 76

(56) References Cited

U.S. PATENT DOCUMENTS

| | | |
|---|---|---|
| D. 210,462 | 3/1968 | Roberts et al. . |
| D. 249,508 | 9/1978 | Coughlin et al. . |
| D. 273,307 | 4/1984 | Yamagami . |
| D. 293,097 | 12/1987 | Alligood et al. . |
| D. 293,671 | 1/1988 | Beaumont . |
| D. 297,946 | 10/1988 | Kuo . |
| D. 309,306 | 7/1990 | Weiser et al. . |
| D. 310,523 | 9/1990 | Hino et al. . |
| D. 313,243 | 12/1990 | Chimalamarri . |
| D. 318,865 | 8/1991 | Ichikawa . |
| D. 326,450 | 5/1992 | Watanabe . |
| D. 333,560 | 3/1993 | Miyashita et al. . |
| D. 334,043 | 3/1993 | Taniguchi . |
| D. 340,932 | 11/1993 | Yan . |
| D. 352,706 | 11/1994 | Hong . |
| D. 353,379 | 12/1994 | Nakamura et al. . |
| 2,478,887 | 8/1949 | Nelson . |

(List continued on next page.)

FOREIGN PATENT DOCUMENTS 1 132 201    6/1962   (DE) .

OTHER PUBLICATIONS

Battery pack for Sonab hand transceivers Pu 38 and Pu 45 (Jun. 1975).

Panasonic–Technics SHOW UPDATE article, dated Jun. 1993. 2 pgs.

*Primary Examiner*—Nay Maung
(74) *Attorney, Agent, or Firm*—Mueting, Raasch & Gebhardt, P.A.

(57) ABSTRACT

The present invention is directed to apparatus and methods for reducing sidetone feedback in a portable wireless telephone system by positioning the speaker and the microphone to reduce acoustic feedback and by controlling the amplifier gain in the transmitter section of the wireless telephone to reduce amplification of sidetone which has been acoustically coupled from the speaker to the microphone. The wireless telephone may be configured as a watch with a wrist strap for retaining it to the user, as a piece of jewelry such as a brooch or pendant, as a voice capable pager/intercom, or as an identification badge for an employee. In one embodiment, the base station includes circuitry for further reducing sidetone feedback. In additional embodiments, the wireless telephone may include a quick-release outboard battery, a retractable earpiece, and an ergonomic keypad.

10 Claims, 23 Drawing Sheets

U.S. PATENT DOCUMENTS

| | | |
|---|---|---|
| 3,032,651 | 5/1962 | Gisiger-Stahli et al. . |
| 3,984,645 | 10/1976 | Kresch . |
| 4,063,410 | 12/1977 | Welling . |
| 4,342,105 | 7/1982 | Dorfman . |
| 4,435,088 | 3/1984 | Schober . |
| 4,486,624 | 12/1984 | Puhl et al. . |
| 4,586,827 | 5/1986 | Hirsch et al. . |
| 4,646,872 | 3/1987 | Kamon et al. . |
| 4,658,425 | 4/1987 | Julstrom . |
| 4,754,285 | 6/1988 | Robitaille . |
| 4,754,473 | 6/1988 | Edwards . |
| 4,800,543 | 1/1989 | Lyndon-James et al. . |
| 4,847,818 | 7/1989 | Olsen . |
| 4,885,728 | 12/1989 | Gosselin . |
| 4,930,148 | 5/1990 | Lee . |
| 4,942,617 | 7/1990 | Boylan . |
| 4,969,180 | 11/1990 | Watterson et al. . |
| 4,993,061 | 2/1991 | Hsieh . |
| 5,008,864 | 4/1991 | Yoshitake . |
| 5,014,294 | 5/1991 | Kromenaker et al. . |
| 5,048,092 | 9/1991 | Yamagishi et al. . |
| 5,054,051 | 10/1991 | Hoff . |
| 5,099,519 | 3/1992 | Guan . |
| 5,113,428 | 5/1992 | Fitzgerald . |
| 5,121,426 | 6/1992 | Baumhauer, Jr. et al. . |
| 5,191,602 | 3/1993 | Regen et al. . |
| 5,214,623 | 5/1993 | Saeger . |
| 5,218,577 | 6/1993 | Saeger . |
| 5,224,076 | 6/1993 | Thorp . |
| 5,239,521 | 8/1993 | Blonder . |
| 5,251,189 | 10/1993 | Thorp . |
| 5,251,329 | 10/1993 | Takagi et al. . |
| 5,260,915 | 11/1993 | Houlihan . |
| 5,274,613 | 12/1993 | Saeger . |
| 5,301,224 | 4/1994 | Major . |
| 5,339,461 | 8/1994 | Luplow . |
| 5,381,475 | 1/1995 | Cavallo . |
| 5,467,324 * | 11/1995 | Houlihan ............................. 368/10 |
| 5,499,292 | 3/1996 | Blonder et al. . |

* cited by examiner

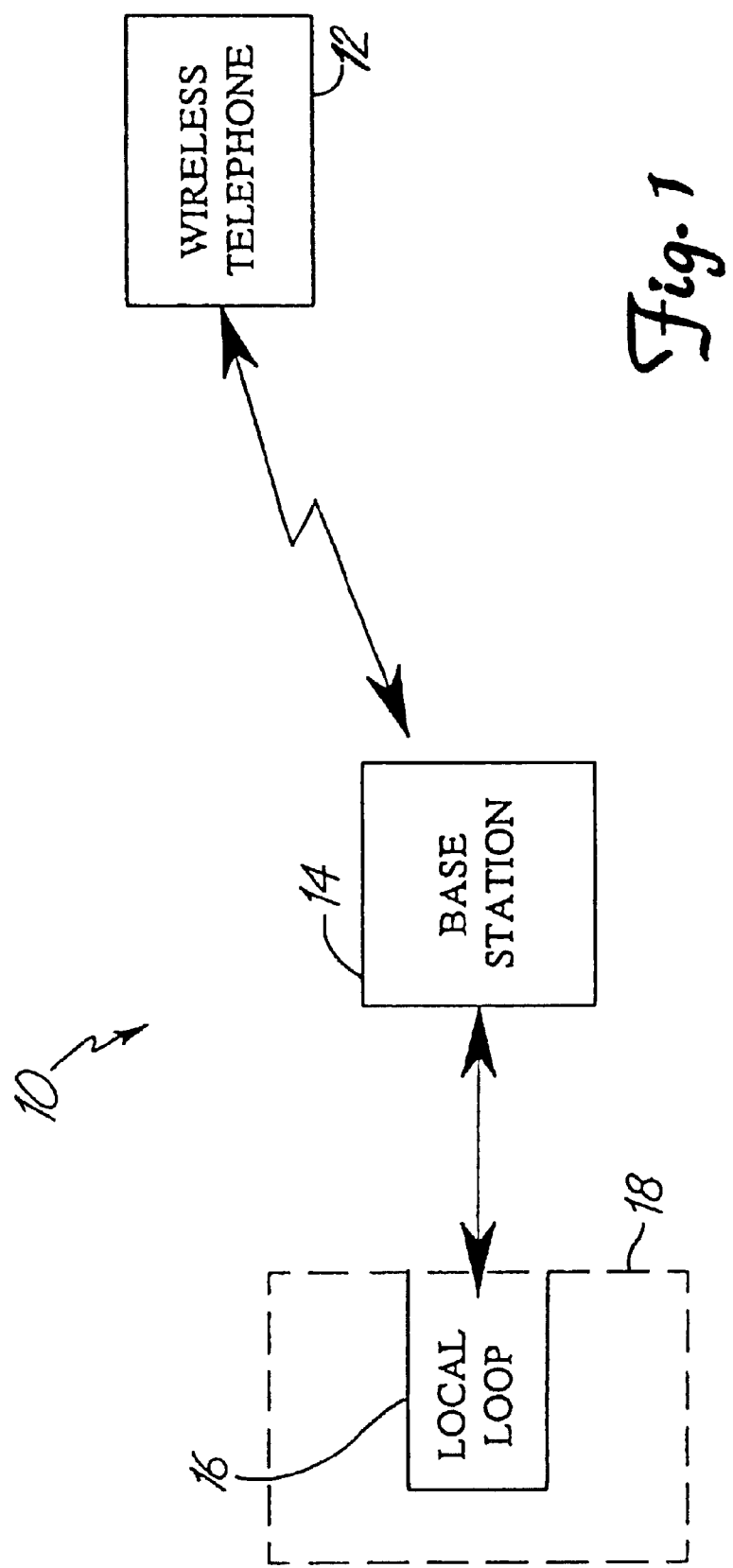

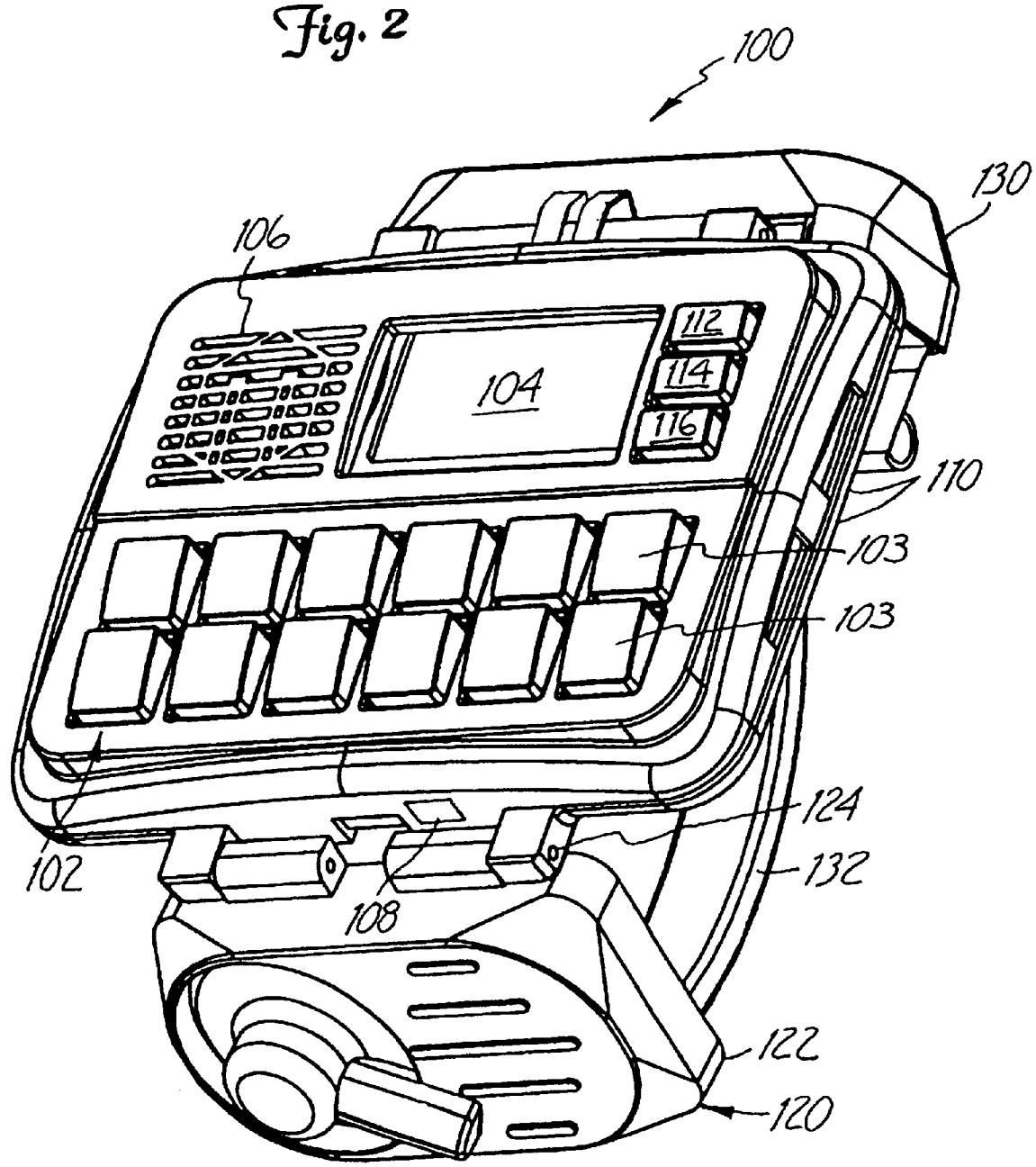

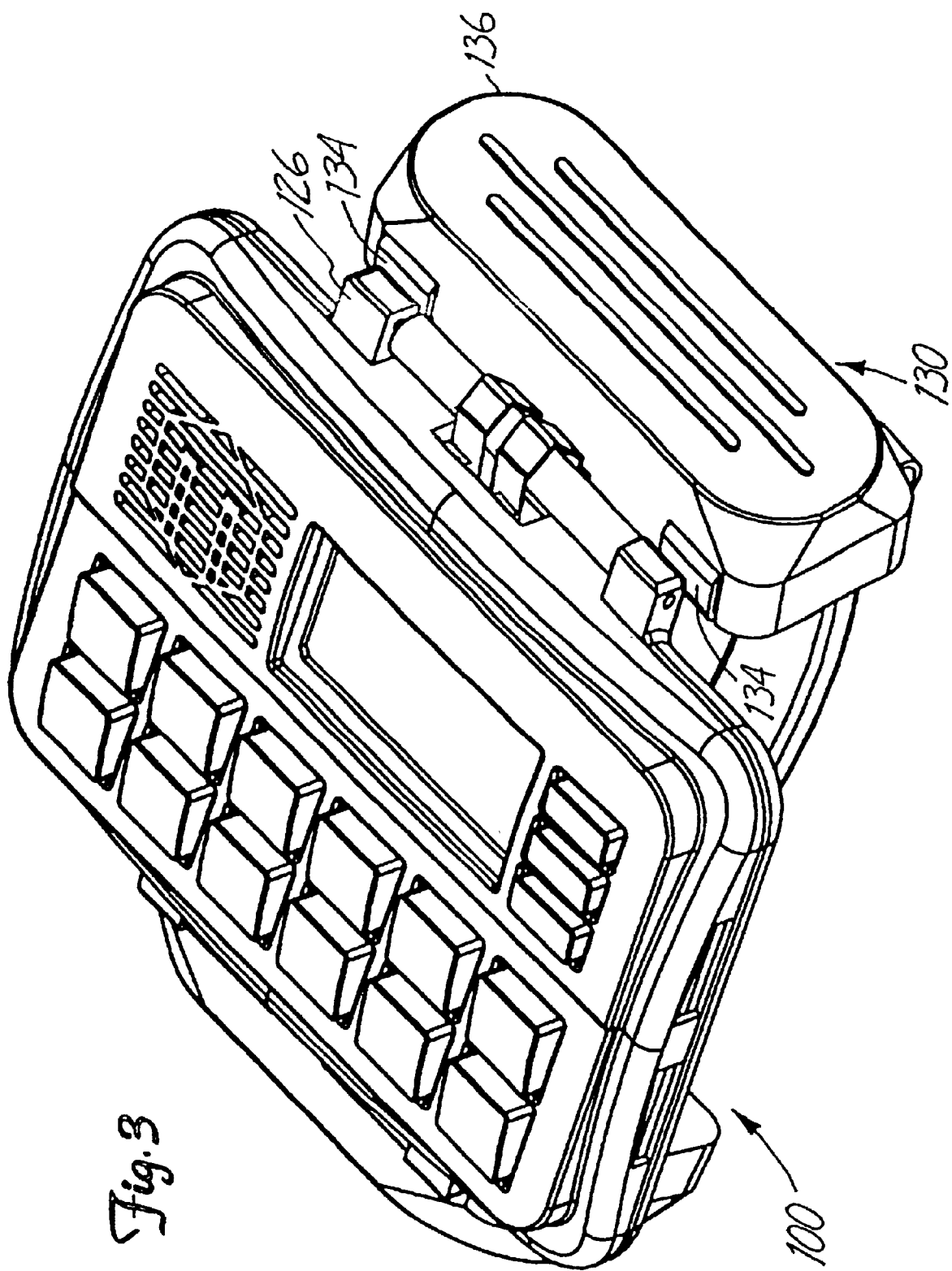

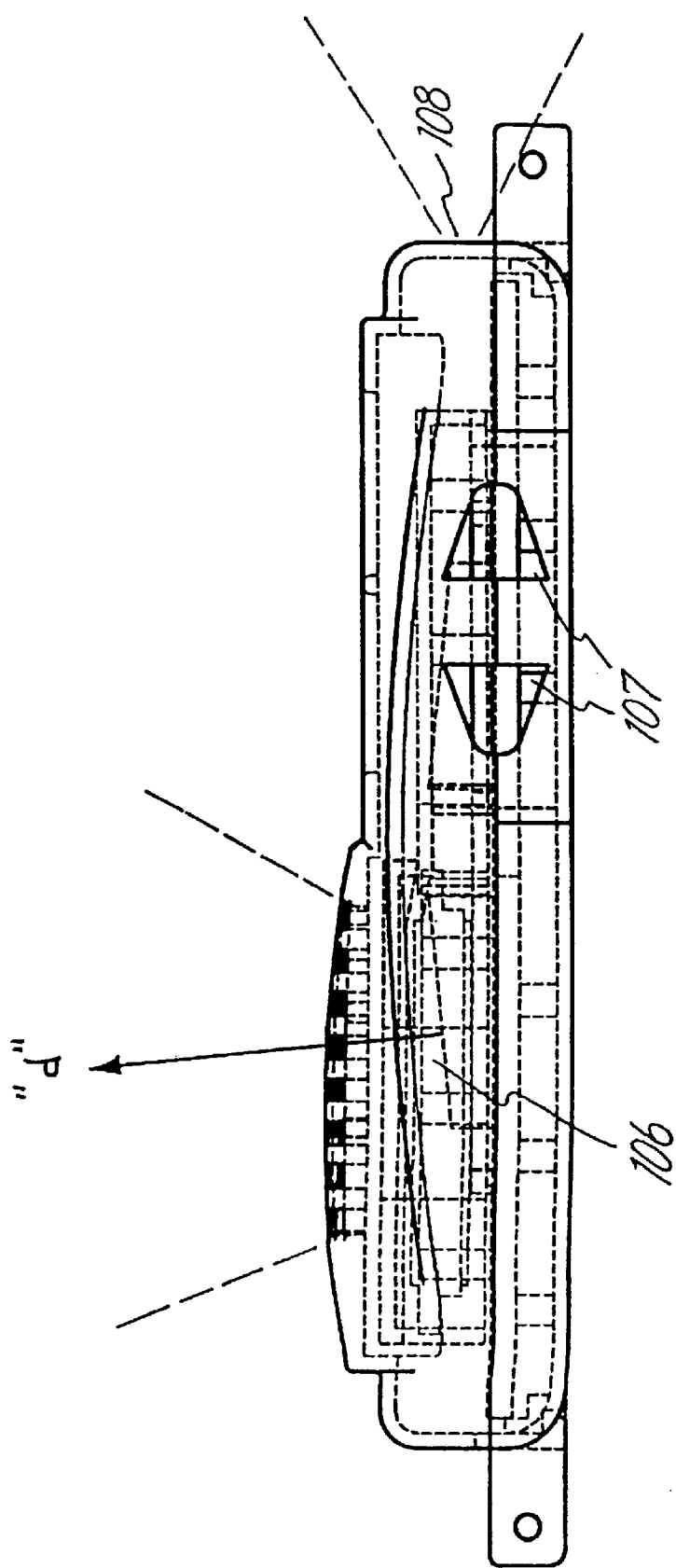

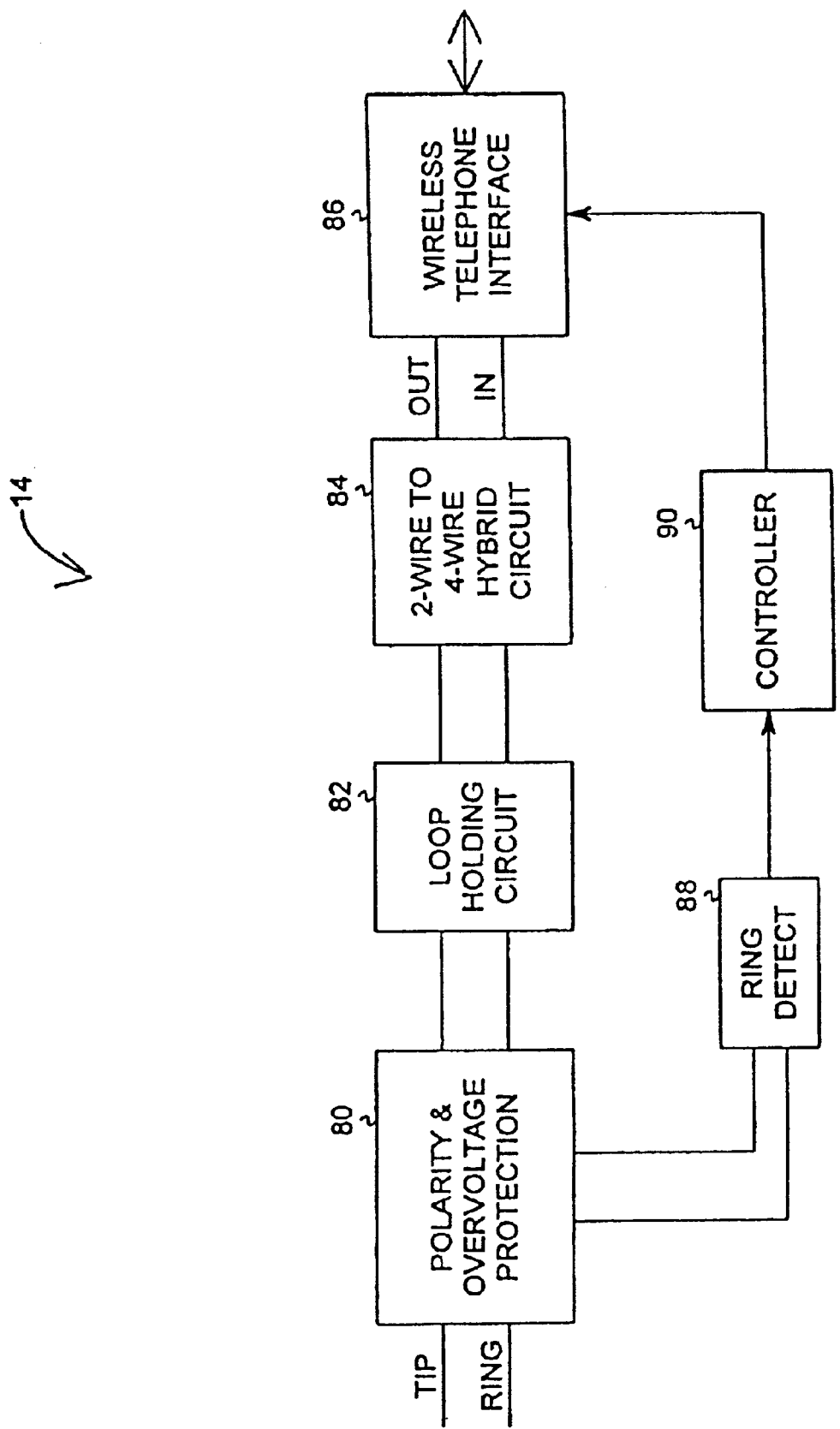

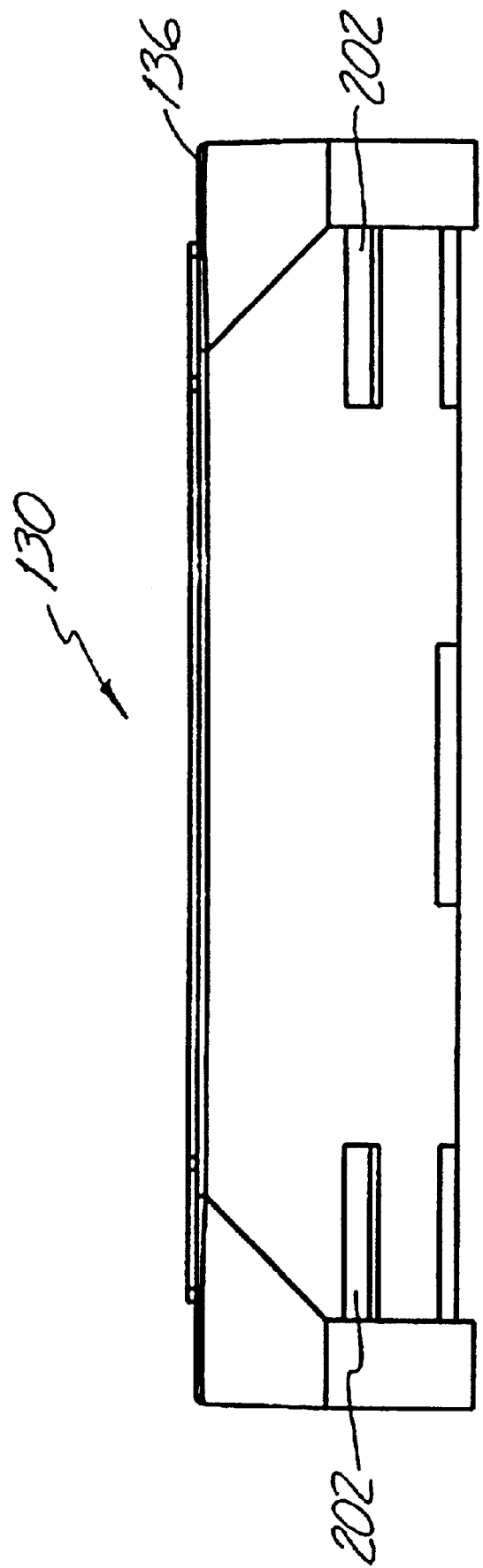

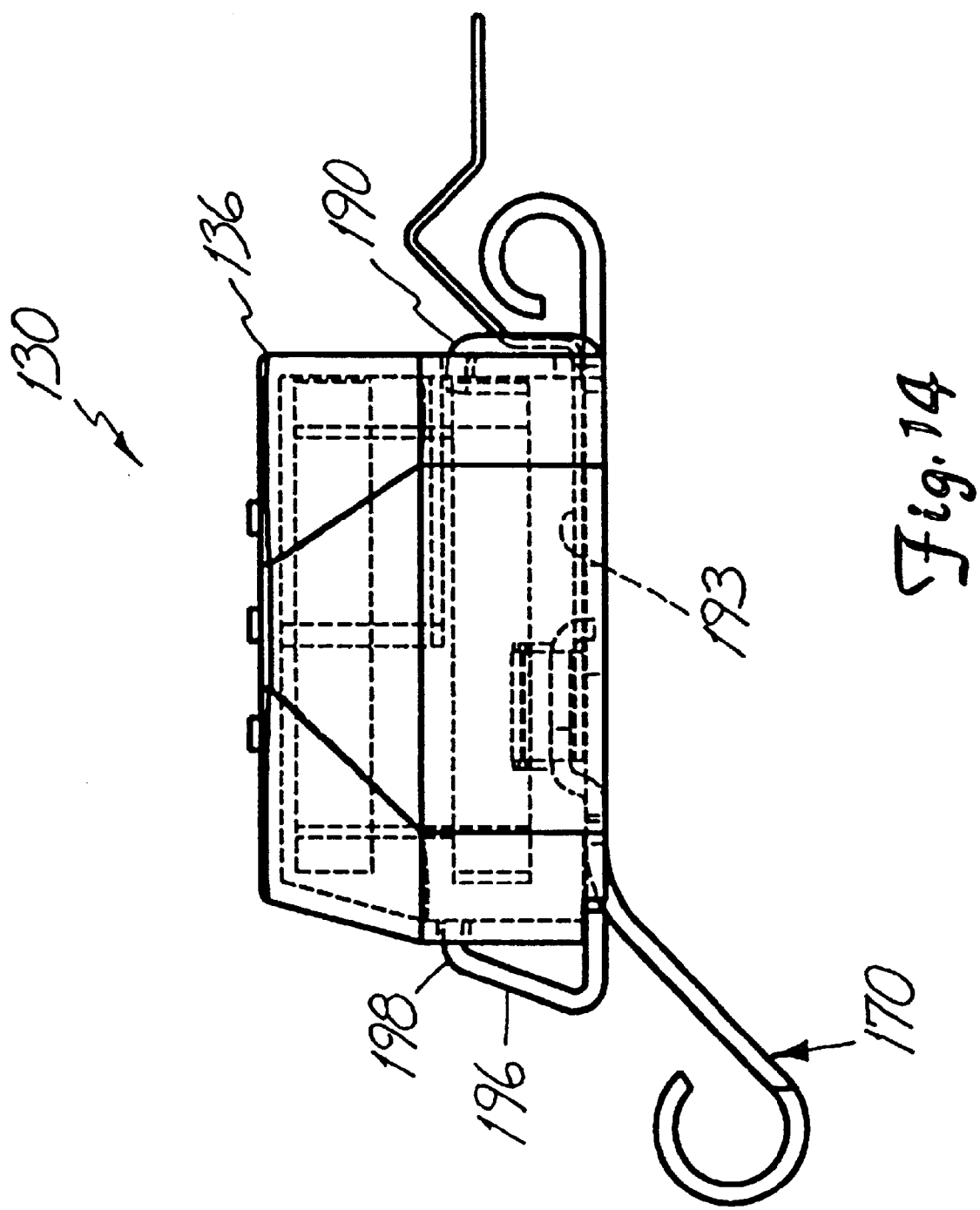

LOW-FEEDBACK COMPACT WIRELESS TELEPHONE

This is a division of application Ser. No. 09/166,661, filed Oct. 5, 1998, and allowed Feb. 24, 2000; U.S. Pat. No. 6,091,965, which is a divisional of application Ser. No. 08/262,735 filed Jun. 20, 1994 (issued as U.S. Pat. No. 5,819,183 on Oct. 6, 1998) which are incorporated herein by reference.

FIELD OF THE INVENTION

The present invention relates to communications systems and in particular to a compact implementation of a wireless telephone. The present invention is also directed to a quick-release outboard battery, a retractable earpiece, and an ergonomic keypad which can be used with such a wireless telephone.

BACKGROUND OF THE INVENTION

As mobile communication has become increasingly critical to the conduct of business, a need has arisen for smaller and more compact telephones. Until now the size and shape of the telephone has been driven in large part by the size of the circuitry needed and by the need to maintain a certain separation between the telephone mouthpiece and the earpiece. Recent developments in integrated circuit technology have driven down the size of the telephone circuitry. According to Olsen, U.S. Pat. No. 4,847,818 issued Jul. 11, 1989 to Olsen and Blonder, U.S. Pat. No. 5,239,521 issued Aug. 24, 1993, however, even if the telephone unit can be sufficiently integrated to fit within a compact body, the telephone microphone and the telephone speaker must still be spaced a certain minimal distance apart in order to prevent feedback from the speaker through the microphone.

Feedback is inherent to telephone design. In the typical telephone, some feedback of the microphone output back through the speaker (in the form of a sidetone) is necessary to serve as an indication to the user of how loudly he or she should speak. However, this feedback can cause problems if it, in turn, is coupled back from the speaker through the microphone. The resulting feedback loop can lead to oscillations heard as an audible hum or howl. Spatial separation reduces the amount of signal coupled from the speaker to the microphone and therefore prevents oscillation.

In compact telephones, such as a wrist-mounted telephone, the spatial separation constraint forces the manufacturer to go through elaborate contortions to place the microphone and/or speaker as satellites attached to the telephone unit body. In Olsen, the speaker is placed at the clasp of the watch while the microphone is either located at the opposite clasp or built into the body of the telephone unit. In Blonder, a special pivoting member is used to separate the microphone from the speaker. Finally, in Yoshitake, U.S. Pat. No. 5,008,864 issued Apr. 16, 1991, a speaking tube is used to provide directionality to the telephone microphone.

However, none of the above solutions is very practical. Olsen and Yoshitake both require that the user remove the watch before placing or receiving a telephone call. Blonder requires the addition of a separate layer attached to the wrist strap that can pivot around the watch band. Such an approach drives up manufacturing costs and reduces reliability.

The feedback problem has also been addressed in the context of speaker phones. Speaker phones will howl if feedback of the sidetone from the speaker through the microphone reaches too high a level. This problem can be controlled by turning the speaker off during times when the user is speaking and by reducing the gain of the microphone amplifier during periods when the speaker is on. Another approach controls oscillation by reducing gain in the speaker amplifier during periods when the user is speaking and then reducing gain in the microphone amplifier during periods when the user is quiet. Since both approaches rely on the accurate detection of whether the user is speaking, they can cause audible discontinuities in both the received and transmitted voice transmissions at the start and end of user speech.

In addition to the feedback problem, portable radio telephones to date, especially those designed to be worn on the wrist, suffer from a number of deficiencies. The power sources for portable radio telephones tend to be short-lived and difficult to replace. Typically, the entire telephone unit must be placed on a recharging stand, rendering it unavailable to the user. Alternatively, the radio telephone must be shut-off to replace the battery.

Also, when a user cannot use the speaker phone because of the need for privacy, a separate earpiece must be located and carefully attached to the phone unit. Separate earpieces are difficult to engage with the phone and easy to misplace.

Additionally, key pads on portable radio telephones, similar to other miniaturized electronic devices such as calculator watches, typically are too small to be operated by hand. The user typically must utilize a pen or other pointed object to activate a particular key.

It is clear that there is a need in the art for a compact wireless telephone which will minimize feedback while providing an acceptable voice signal. In addition, there is a need in the art for a compact wireless telephone which includes an ergonomic keypad, a retractable earpiece attached to the wireless telephone and a power supply which is easy to replace yet long-lasting.

SUMMARY OF THE INVENTION

The present invention is directed to a low-feedback portable wireless telephone having a wireless transceiver connected to a microphone and a speaker. The wireless telephone may either be configured as a watch with a wrist strap for retaining it to the user, as a piece of jewelry such as a brooch or pendant, as a voice capable pager/intercom, or as an identification badge for an employee.

In the embodiment where the radio telephone is used as an identification badge, each unit preferably is given a unique code which identifies the user. The radio telephone operates as a transponder, sending an identification signal at some predetermined interval or responding to a signal from a base station. By arranging several base stations around a facility, the present identification badge/portable radio telephone can operate as a personnel locator and communicator.

The telephone includes a base station interface for transferring information between the telephone unit and a base station connected to the local loop of a public telecommunications network. A directional speaker for radiating speaker sound in predominately a first direction is provided. A speaker circuit connected to the base station interface and the directional speaker is provided for driving the speaker with a signal received from the base station interface. A directional microphone is positioned to be most sensitive to sound coming from a second direction at approximately 90 degrees offset from the first direction. A microphone circuit connected to the directional microphone and the base station interface is provided for driving the base station interface with a signal corresponding to sound received by the directional microphone. The microphone circuit includes an amplifier having an amplifier gain controlled to constrain the amount of speaker sound fed back to the base station.

According to yet another aspect of the present invention, a base station is described which works in conjunction with the above telephone to provide a cordless or cellular telephone system.

According to yet another aspect of the present invention, a telephone system is described in which feedback is controlled in both the base station and the telephone unit. The telephone includes a base station interface for transferring information between the telephone unit and a base station connected to the local loop of a public telecommunications network. A directional speaker is provided for radiating speaker sound in predominately a first direction. A speaker circuit connected to the base station interface and the directional speaker is provided for driving the speaker with a signal received from the base station interface. A directional microphone is positioned to be most sensitive to sound coming from a second direction at approximately 90 degrees offset from the first direction. A microphone circuit is connected to the directional microphone and the base station interface for driving the base station interface with a signal corresponding to sound received by the directional microphone. The base station includes a telephone unit interface and a telephone line interface which includes means for reducing sidetone.

According to yet another aspect of the present invention, a quick-release outboard battery is described for use with a compact wireless telephone. A battery clasp is attached to the compact wireless telephone. The battery clasp has a battery attachment member and electrical contacts connected to the telephone. A battery housing containing at least one battery is provided with a receiving member. The receiving member is arranged to engage with the attaching member on the battery clasp so that the at least one battery electrically engages the electrical contacts for powering the telephone.

In an embodiment in which the compact wireless telephone is designed to be mounted on the wrist, the battery clasp may be located on the wrist straps or attached directly to the radio telephone.

The attaching member on the battery clasp is designed to allow quick release of the battery housing so that a replacement battery can be easily attached to the compact wireless telephone. In the preferred embodiment, the attaching member is a T-shaped battery receiving structure. The receiving member is a T-shaped receiving slot on the battery assembly. In an alternate embodiment, the attaching member has inwardly-biased opposing hook members, which create a compression force on the battery housing to retain the battery housing to the battery clasp.

In the preferred embodiment, the base station can be signalled to suspend a call for a programmed period of time while a user changes the battery.

The present invention is also directed to a retractable earpiece assembly for a compact wireless telephone in-which an earpiece containing a transducer is attached to the radio telephone by an electrical cord. A rotatable cord spool is attached to the radio telephone for storing the cord when it is in a retracted configuration. A retraction mechanism is provided for automatically rewinding the cord onto the spool after the cord has been manually withdrawn. In one embodiment, the rotatable cord spool is retained in a housing attached to the radio telephone or to wrist straps for the wrist phone embodiment.

It will be understood that the compact wireless telephone may be used in combination with the quick release outboard battery and/or the retractable earpiece assembly discussed above.

The compact wireless telephone preferably includes an ergonomically designed keypad in which the keys are canted so that they may be operated by the user's finger rather than a pointed object.

BRIEF DESCRIPTION OF THE DRAWINGS

FIG. 1 is a top-level block diagram of a cordless telephone system according to the present invention;

FIG. 2 is a front perspective view showing one embodiment of a wrist-mounted wireless telephone having a battery assembly and retractable earpiece assembly attached thereto;

FIG. 3 is a rear perspective view of the wrist-mounted cordless telephone of FIG. 2;

FIG. 4 is a side view of one embodiment of the wrist-mounted cordless telephone of FIG. 2;

FIG. 5A is a block diagram of a base station;

FIG. 12 is a rear view of the alternate outboard battery assembly of FIG. 11;

FIG. 14 is a side view of the alternate outboard battery assembly attached to the alternate battery clasp;

DETAILED DESCRIPTION OF THE PREFERRED EMBODIMENTS

Figure 5B:
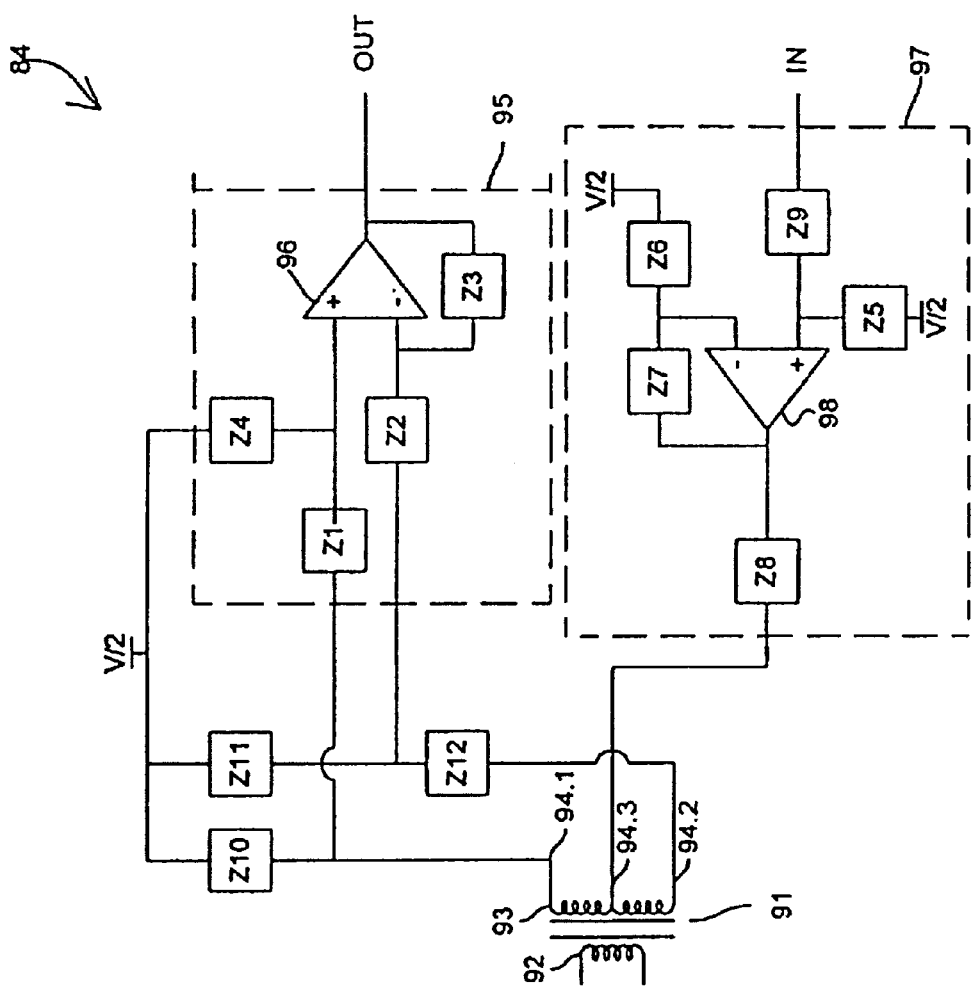
FIG. 5B is a more detailed block diagram of sidetone cancellation circuitry used in the base station of FIG. 5A according to the present invention.

In the following detailed description of the preferred embodiment, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims.

A top-level block diagram of a wireless telephone system 10 is shown in FIG. 1. In the system of FIG. 1, wireless telephone unit 12 is connected through a base station 14 to the local loop 16 of a public telecommunications network 18. Base station 14 includes an RF interface for communicating with wireless telephone unit 12 and telephone line interface circuitry which can be connected to local loop 16 in order to communicate over public telecommunications network 18 (see FIG. 5A). The telephone line interface circuitry may be a simple telephone line connection such as is used in the typical cordless telephone.

Alternatively, in systems 10 which support cellular communications, base station 14 includes circuitry which communicates through a Mobile Telecommunications Switching Office (MTSO)(not shown) to public telecommunications network 18. In such systems, each base station 14 is assigned to a cell and the MTSO determines which cell is to communicate with telephone unit 12. Base stations for use in cellular or cordless telephone applications are well known in the art and will not, therefore, be described in detail.

Wireless telephone unit 12 is designed to be easily carried by a user. In one embodiment, such as is shown in FIG. 2, unit 12 is configured as a wrist-mounted radio telephone 100 which can be attached to a user with a wrist band 132. In another embodiment, unit 12 may be worn as a pin or brooch. In another embodiment, unit 12 may be suspended from a chain worn around the neck of a user, attached to clothing in a manner similar to an employee badge, or placed in a pocket.

FIG. 2 is a perspective view of the preferred embodiment of wireless telephone unit 12. In FIG. 2, compact wireless telephone 100 has a keypad 102, an LCD 104, and a speaker 106. The LCD 104 preferably displays the phone number dialed for an outgoing call or the source number for an incoming call, the date and time, indicates a low battery condition, and whether the intercom or mute functions are activated (see FIG. 6). A microphone 108 is provided on the front edge of the telephone 100. The microphone 108 preferably is directionally offset from the speaker 106 by 90 degrees.

Program keys 110 are provided on the side of the telephone 100 for programming the memory of the telephone (as will be discussed below). Volume keys 107 are provided on the opposite side of the radio telephone 100 for adjusting the volume of the speaker 106 (see FIG. 4). The keypad 102 includes the primary twelve keys on a standard telephone and three additional keys for a Talk function 112, a Hold function 116, and an Intercom function 114.

As discussed above, prior key pads on portable electronic devices are typically so small that the user needs a pointed object such as a pen to activate an individual key. The individual keys on the keypad 102 preferably are canted or tilted so as to present a high point 103 which facilitates operation by a user's finger.

A retractable earpiece assembly 120 preferably is attached to the front edge of the telephone 100 by a hinge mechanism 124. An outboard battery assembly 130 is attached to the rear edge of the telephone 100 by a similar hinge mechanism 126 (see FIG. 3). The wrist strap 132 is provided for attaching the compact wireless telephone 100 to the wrist of a user. However, it will be understood that the present compact wireless telephone 100, battery assembly 130, or earpiece 120 may be configured in any shape that is convenient for the user.

FIG. 3 is a rear perspective view of the compact wireless telephone 100 showing an alternate outboard battery assembly 130. As will be discussed in detail below, a pair of rear hook members 134 engage with corresponding slots (not shown) to releasably retain a battery housing 136 to the phone 100.

The feedback loop formed by transmission of sidetone back from the receiver to the transmitter is a critical problem in the design of a compact telephone or speaker phone. Sidetone is generated by the 2-wire to 4-wire hybrid circuit required by the telephone company and, to a lesser extent, by reflections occurring within network 18 itself. In addition, many standard telephone integrated circuits have sidetone generation built in. All sources of sidetone are summed, amplified and routed through the user's speaker. This output must be loud enough to hear and, consequently, may be loud enough to be picked up and amplified by the telephone unit transmitter.

As noted above, spatial separation can be helpful in minimizing the amount of sidetone fed back through the transmitter. As components get smaller, however, it is more and more difficult to achieve meaningful separation in a useful design. Therefore steps must be taken not only to isolate the transmitted and received sounds but also to reduce the amplification of sidetone reflected through the transmitter of telephone unit 12.

One embodiment which reduces transmission of sidetone back through the transmitter of telephone unit 12 is shown in FIGS. 2 and 4. FIG. 4 is a side view of a wireless telephone unit 100 which can be used in a cellular or cordless telephone system 10. In the embodiments shown in FIGS. 2 and 4, spatial separation of the received and transmitted sound is enhanced by placing speaker 106 so that sound is radiated in a direction "d" which is a minimum of 90 degrees away from the direction in which microphone 108 is pointed.

In one such an embodiment, spatial separation is enhanced by using a directional speaker and a directional microphone as speaker 106 and microphone 108. One such directional speaker is a Model No. KR2083 speaker available from Keyrin of Taiwan. One such directional microphone is a Model No. WM62-A microphone available from Matsushita of Tokyo, Japan. Further acoustic separation can be achieved by canting speaker 106 such that the direction is greater than 90 degrees. In addition, if speaker 106 and microphone 108 are directional enough, angles of less than 90 degrees are possible.

Finally, as can be seen in FIG. 2, speaker 106 and microphone 108 are placed as far away from each other as possible while still remaining in the same package. By placing speaker 106 and microphone 108 so that their mounting axes are offset approximately 90 degrees or greater and by placing speaker 106 and microphone 108 on the diagonal at opposite corners of telephone unit 100, acoustic coupling of speaker 106 to microphone 108 is minimized. The combination of directionality with positioning results in an embodiment in which speaker 106 can be located 2.5 cm (0.984 inches) from microphone 108. In the preferred embodiment, as is shown in FIGS. 2 and 4, the speaker 106 is located 3.5 cm (1.38 inches) from the microphone 108.

The placement of speaker 106 and microphone 108 in a compact device such as wireless telephone unit 12 can lead to some problems due to magnetic coupling of speaker magnets to oscillator inductors. Communications devices such as telephone unit 12 typically include high Q tank circuits which are very sensitive to outside disturbances. The magnetic field and flux generated by the speaker magnet of speaker 106 can cause a disturbance in the oscillators which can feedback through speaker 106 to form another oscillatory loop. In one embodiment, oscillator inductors are shielded and placed as far physically from speaker 106 as possible. For example, in the telephone unit 12 of FIG. 2 shielded oscillator inductors are clustered in the vicinity of microphone 108 to reduce magnetic coupling between the inductors and speaker 106.

The interaction of the oscillator inductors with the speaker magnet can also result in a microphonic effect seen when the speaker 106 magnetic field is moved suddenly with respect to the oscillator inductors. Such an effect can be minimized by providing a secure, mechanically stable environment such that when telephone unit 12 is disturbed, both the speaker magnet and the inductors move together. In one embodiment, a soft rubber bonnet or boot is placed around speaker 106 in order to provide additional mechanical stability. In another embodiment, an annular ring is placed around speaker 106. In another embodiment, a soft rubber cushion is built into the rubber keypad to provide the required mechanical support. It will be understood that a variety of techniques and elastomeric materials are available for achieving mechanical stability.

In addition to physical separation of speaker 106 and microphone 108 to reduce feedback of sidetone, steps have been taken to reduce sidetone. For instance, the frequency of oscillation of sidetone feedback tends to be centered about a particular frequency. Therefore, the effects of sidetone on telephone unit 12 can be minimized by either providing a notch filter at that frequency in the circuit driving speaker 106 or by reducing feedback of the sidetone at that frequency in the 2-wire to 4-wire hybrid circuit. One method of reducing feedback of the sidetone within the 2-wire to 4-wire hybrid circuit is shown in FIGS. 5A and 5B.

In FIG. 5A, base station 14 includes a polarity and overvoltage protection circuit 80, a loop holding circuit 82, a 2-wire to 4-wire hybrid circuit 84, a wireless telephone interface 86, a ring detect circuit 88 and a controller 90. Polarity and overvoltage protection circuit 80 is of the type typically used in electronic telephones. Loop holding circuit 82 draws the off-hook current required to tell local loop 16 that base station 14 wishes to be connected to public telecommunications network 18. 2-wire to 4-wire hybrid circuit 84 provides the signal separation and rejoining required by the telephone company. Wireless telephone interface 86 communicates with telephone unit 12 through any known means of wireless communication (radio, infrared, ultrasonic, etc.). Controller 90 controls the interface with local loop 16 and communication over wireless telephone interface 86 Ring detect circuit 88 detects the ring signal received from local loop 16 and generates an interrupt to controller 90 regarding the detection of the ring signal.

One embodiment of a 2-wire to 4-wire hybrid circuit 84 is shown in FIG. 5B. In circuit 84 of FIG. 5B, a transformer 91 isolates base station 14 from local loop 16. Transformer 91 includes windings 92 and 93. Winding 92 is connected to the local loop side of hybrid circuit 84 while winding 93 is connected to the telephone side of circuit 84. Winding 93 has three taps 94.1–3. Taps 94.1 and 94.2 are electrically connected to a receiver amplifier circuit 95 in a manner known in the art while tap 93.3 is electrically connected to transmitter amplifier circuit 97. Audio received at transformer 91 from local loop 16 is out of phase and is therefore differentially summed by amplifier 96 of receiver amplifier circuit 95. Meanwhile, an audio signal obtained from transmitter amplifier circuit 97 is in phase and therefore cancelled. In one embodiment, cancellation is frequency dependent. That is, a notch filter is used to attenuate frequencies centered around those frequencies associated with sidetone oscillations. In practice the frequency of sidetone oscillation varies according to the construction of hand unit 10 and the placement of speaker 106 and microphone 108. Therefore, the circuit must be tuned to compensate. In one such embodiment, amplifiers 96 and 98 are Model No. LM324 operational amplifiers such as are available from Motorola. In such an embodiment, an advantageous choice of impedances Z1–Z12 is as follows:

| | |
|---|---|
| Z1 | 0.1 μF |
| Z2 | 0.1 μF in series with 100 kΩ |
| Z3 | 2 MΩ |
| Z4 | 100 kΩ |
| Z5 | 100 kΩ |
| ZG | 10 kΩ |
| Z7 | 100 kΩ |
| Z8 | 680 Ω |
| Z9 | 0.1 μF |
| Z10 | 330 Ω |
| Z11 | 6.8 kΩ |
| Z12 | 100 kΩ |

Figure 6A:
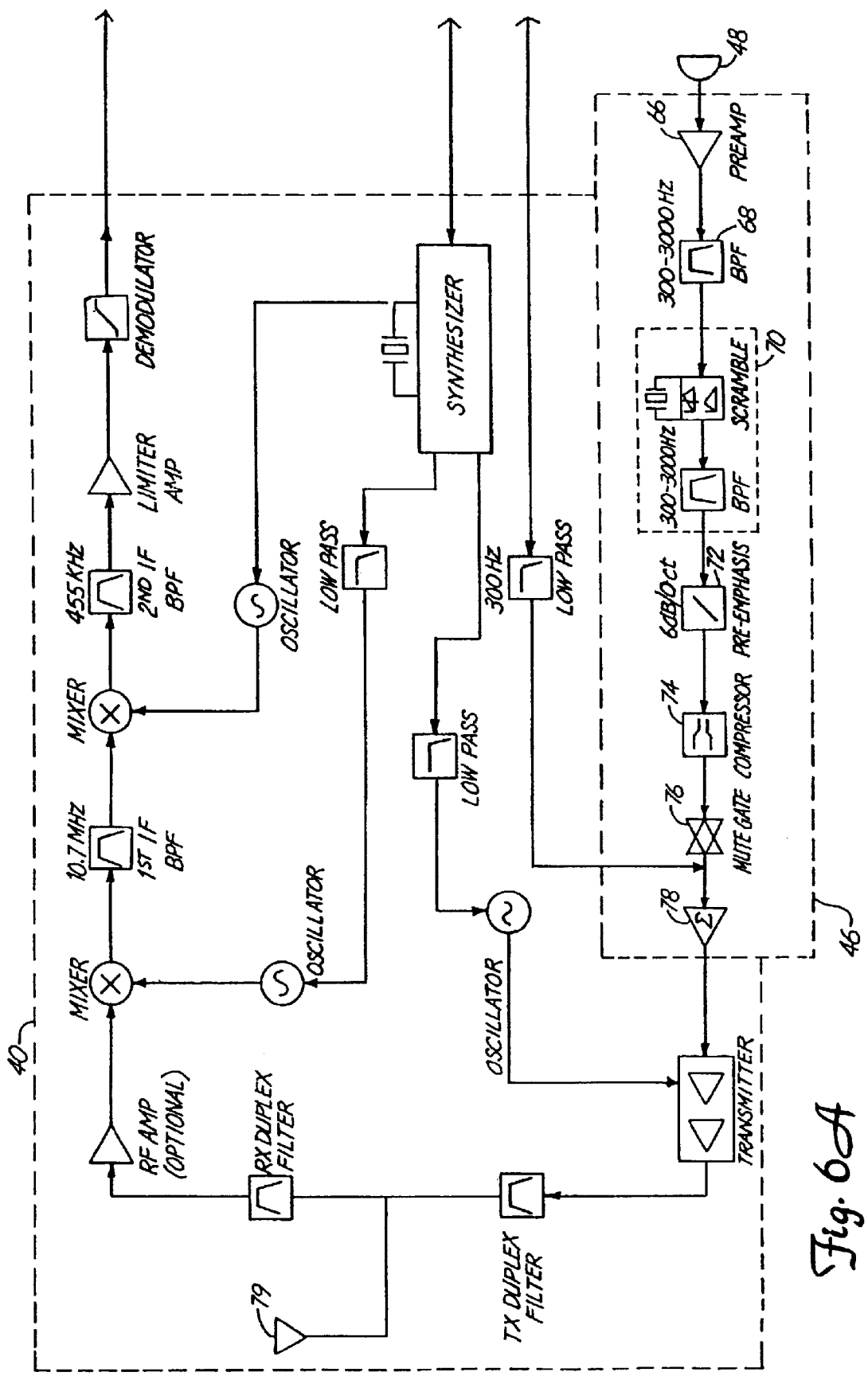
FIG. 6 is a block diagram of the internal circuitry of the wrist-mounted cordless telephone of FIG. 2.
Figure 6B:
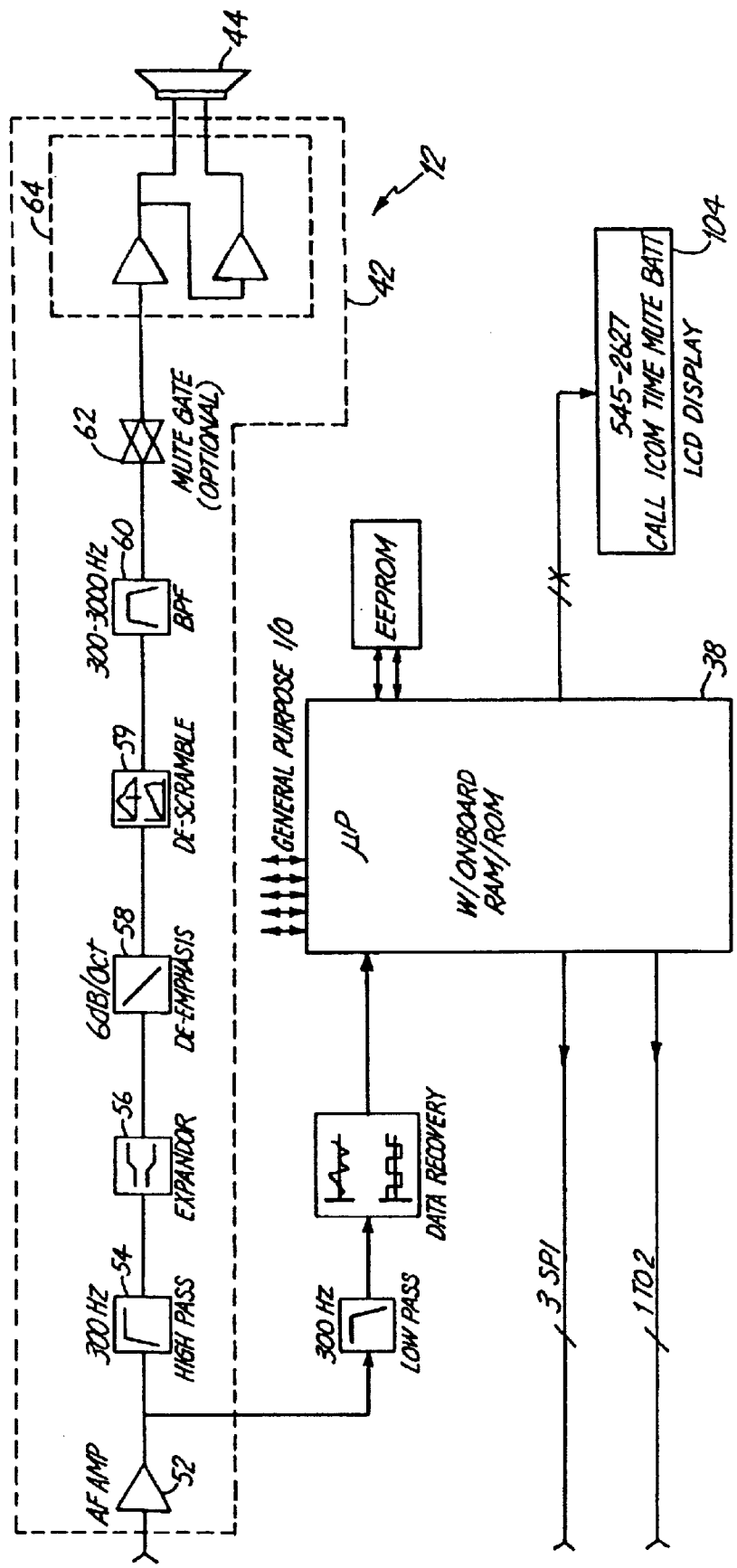

Feedback of sidetone can also be controlled by judicious selection of transmitter amplifier gains. Transmitter amplifier gains may be set so that sidetones received by microphone 108 are not amplified above a threshold level. One embodiment of a low feedback wireless telephone unit 12 is shown in FIG. 6. In telephone unit 12 of FIG. 6, telephone unit 12 includes a controller 38, a base station interface circuit 40 for transferring information between base station 14 and telephone unit 12, a speaker circuit 42, a directional speaker 44, a microphone circuit 46 and a directional microphone 48. Speaker circuit 42 is connected to base station interface circuit 40 and directional speaker 44 and is used for driving directional speaker 44 with a speaker signal received from base station 14. Microphone circuit 46 is connected to directional microphone 48 and base station interface circuit 40 and is used for driving base station interface circuit 40 with a microphone signal corresponding to sound, including speaker sound, received by directional microphone 48.

In the embodiment shown in FIG. 6, speaker circuit 42 includes an AF amplifier 52, a high pass filter 54, an expander 56, deemphasis 58, optional descrambler 59, band pass filter 60, optional mute gate 62 and output amplifier 64. In one such embodiment, speaker circuit 42 is designed to provide approximately 29.6 dB of gain at 1 kHz.

Microphone circuit 46 is designed to have an amplifier gain controlled to limit the amount of speaker sound fed back to the base station. In the embodiment of FIG. 6, microphone circuit 46 includes a preamplifier 66, a bandpass filter 68, optional scrambler/bandpass filter 70, preemphasis 72, compressor 74, mute gate 76 and summing amplifier 78. In one such embodiment, preamplifier 66 has a gain of 20 dB, scrambler/bandpass filter 70 has unity gain, preemphasis 72 adds 6 dB/octave of preemphasis and summing amplifier 78 has unity gain. In addition, the transmitter amplifier of base station interface 40 is part of the Motorola MC2833 transmitter integrated circuit, which adds 9.5 dB of gain.

In one embodiment, antenna 79 of base station interface 40 is a dipole antenna embedded in the wrist strap of wireless telephone unit 12. In an alternate embodiment, antenna 79 is a loop antenna embedded in or as an integral part of cover plate 150 of wireless telephone unit 100 (such as is shown in FIG. 8).

Figure 7:
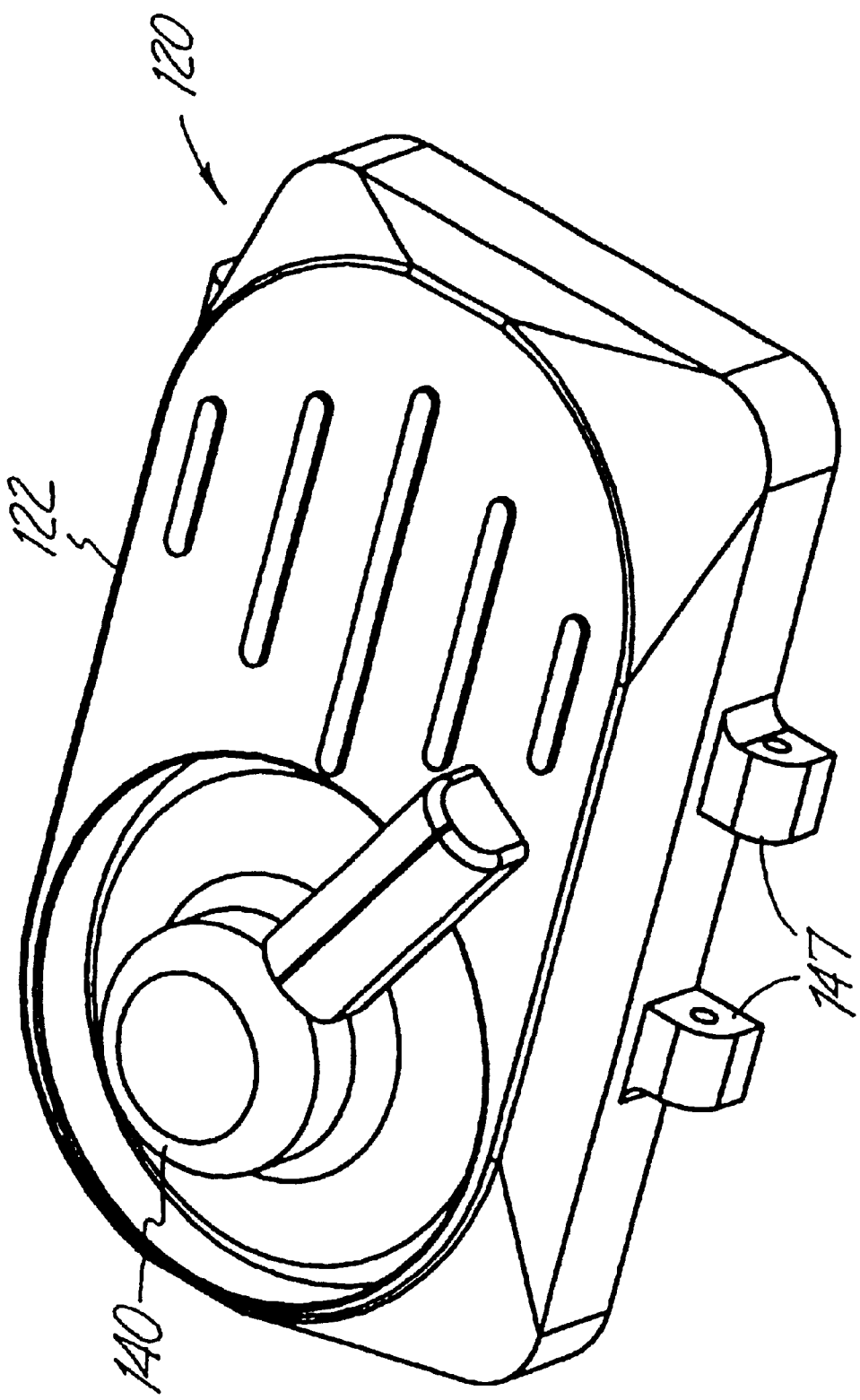
FIG. 7 is a perspective view of the preferred retractable earpiece assembly.
Figure 7A:
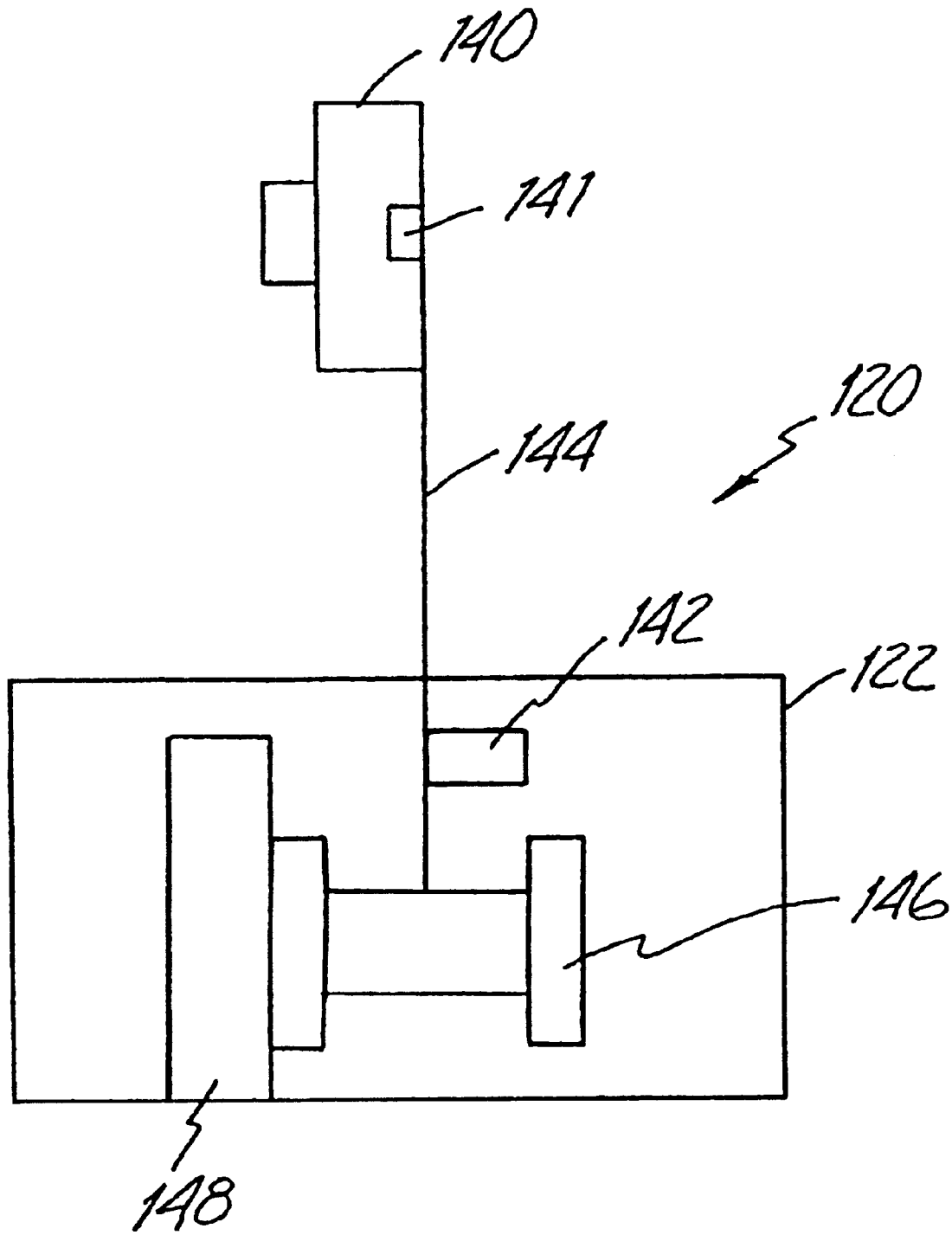
FIG. 7A is schematic illustration of the earpiece of FIG. 7.

FIGS. 7 is a perspective view of the preferred retractable earpiece assembly 120. FIG. 7A is a schematic illustration of the retractable earpiece assembly 120 having an earpiece 140 containing a transducer 141 attached to the earpiece housing 122 by a cord 144. The cord 144 preferably is braided to provide increase strength and greater reliability. The cord 144 is engaged with a rotatable cord spool 146. A retraction mechanism 148, such as a coiled leaf spring, automatically rewinds the cord 144 onto the spool 146 after the cord has been manually withdrawn. A switch 142 is provided to activate the transducer 141 when the earpiece 140 is withdrawn a predetermined distance from the earpiece housing 122 and deactivate the transducer 141 when the earpiece 140 is retracted. A hinge mechanism 147 is provided for attaching the wrist strap 132 to the earpiece assembly 120. A retraction mechanism known to be suitable for this purpose is disclosed in U.S. Pat. No. 3,984,645 issued to Kresch on Oct. 5, 1976, which is hereby incorporated by reference.

Figure 8:
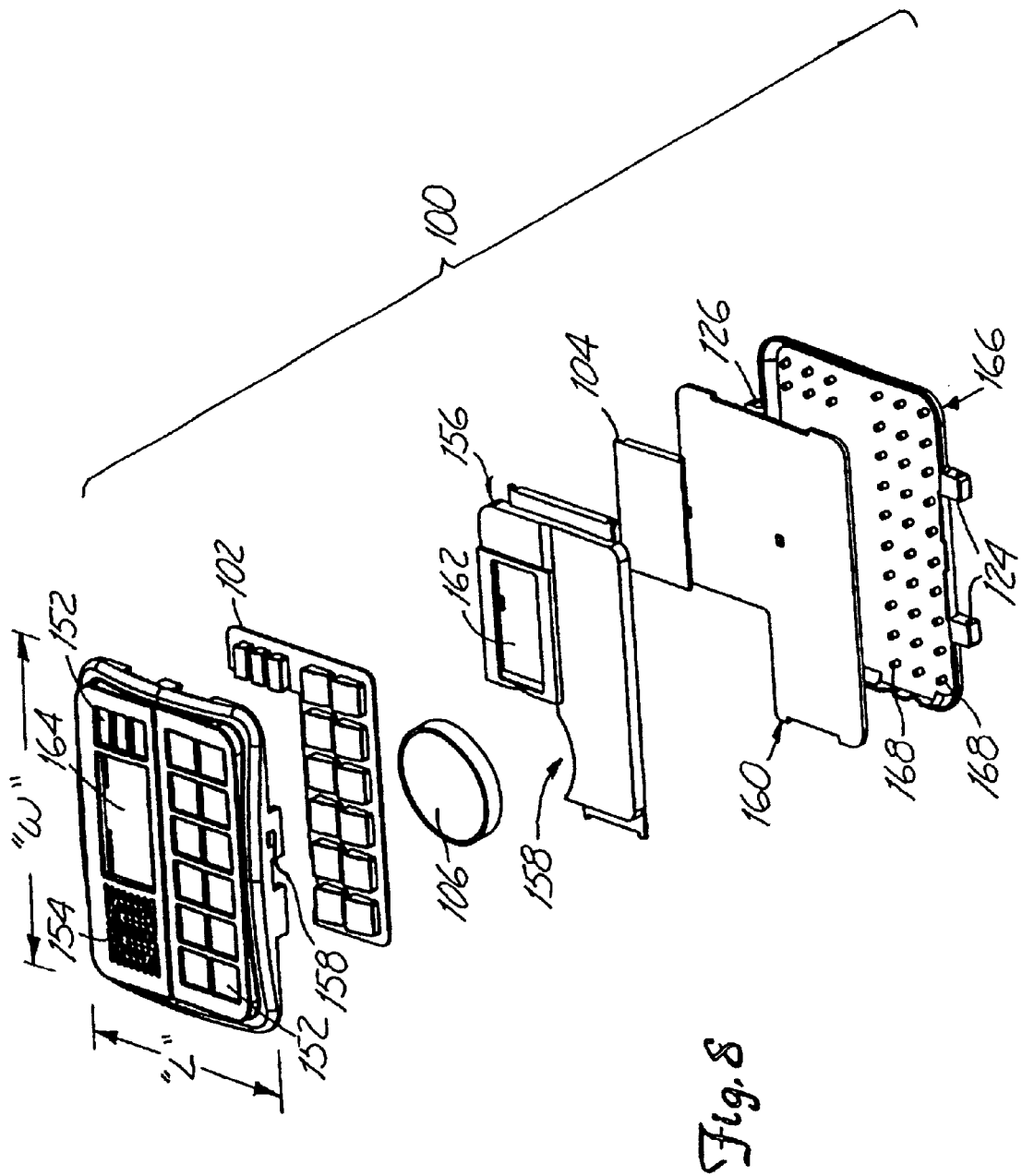
FIG. 8 is an exploded view of the preferred compact wireless telephone.

FIG. 8 is an exploded view of the preferred compact wireless telephone 100. Cover plate 150 has keypad openings 152 for the keypad 102. A speaker opening 154 is provided in the uppermost corner of the cover plate 150 so as to be as far from the microphone opening 158 as possible. A midplane 156 is provided to support the keypad 102. A cutout 158 is provided in the midplane 156 for the speaker 106. An LCD 104 is interposed between the midplane 156 and the printed circuit board 160 so that the LCD 104 is visible through the openings 162, 164 in the midplane 156 and cover plate 150, respectively. A back plate 166 is provided with numerous removable supports 168 to support the PC board 160 and other components. The removable supports 168 may be snapped off during assembly to make room for electrical components as required. Finally, the back plate 166 has portions of a hinge mechanism 124, 126 for attaching the radio telephone 100 to a user.

The back plate 166 may also include a non-audible tactile annunciator 184 to alert the user that a page or call is being received. Although the annunciator 184 is preferably a micro-motor with an eccentric cam, it will be understood that a variety of vibro-tactile mechanisms are suitable for this purpose, such as a piezo-electric device, and that the present invention is not limited by the particular mechanism disclosed.

When assembled, the present compact wireless telephone 100 is only 0.275 inches (7.0 mm) thick. The preferred phone 100 is 1.57 inches (39.9 mm) in the direction "W" and 2.17 inches (55.1 mm) in the direction "L" so that it does not extend out orthogonally from the user's wrist. The preferred wrist mounted compact wireless phone embodiment can therefore easily be worn even by individuals with small wrists.

Figure 19:
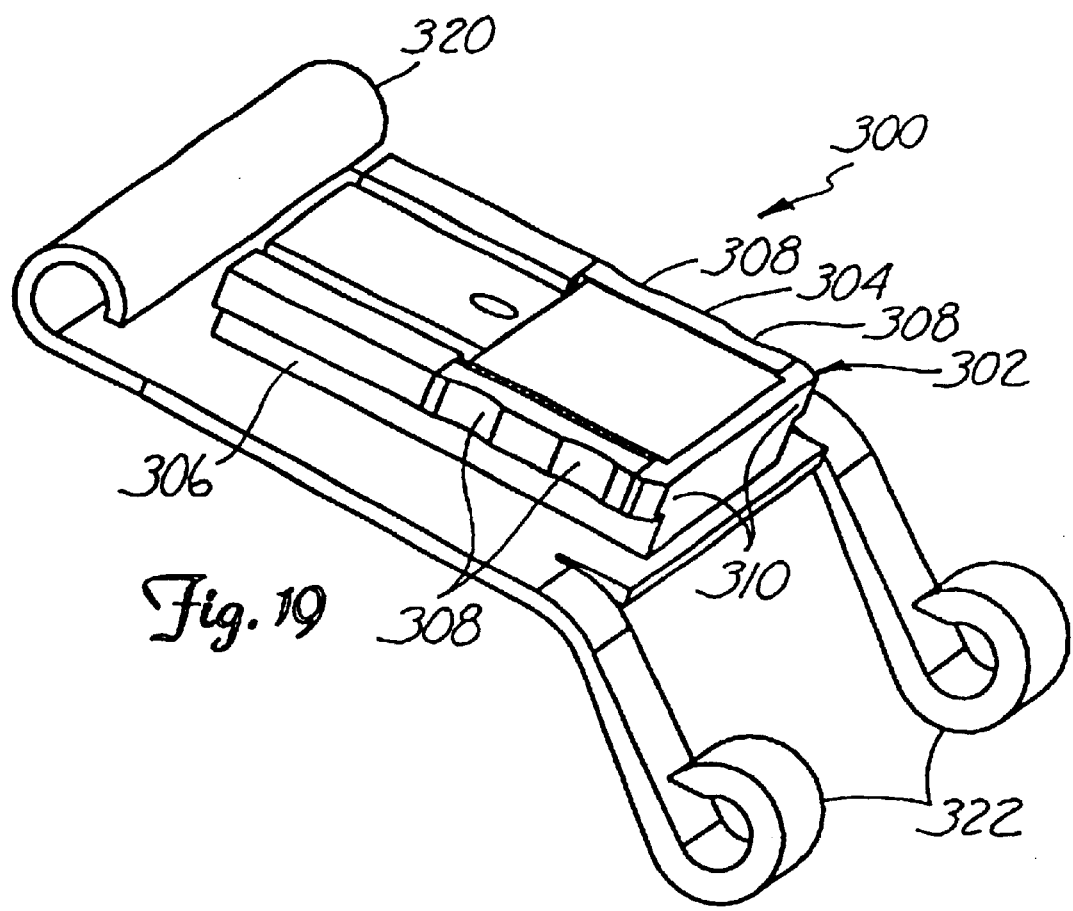
FIG. 19 is a perspective view of the preferred battery clasp.

FIG. 19 is a perspective view of a preferred battery clasp 300 having a "hot shoe" battery receiving structure 302. The battery receiving structure 302 is generally "T" shaped, with a top portion 304 which is wider than a bottom portion 306. The top portion 304 has a pair of detents 308 on each edge for retaining a battery assembly (see FIG. 21) to the clasp 300. In the preferred embodiment, the detents 308 also operate as electrical contact points.

Figure 20:
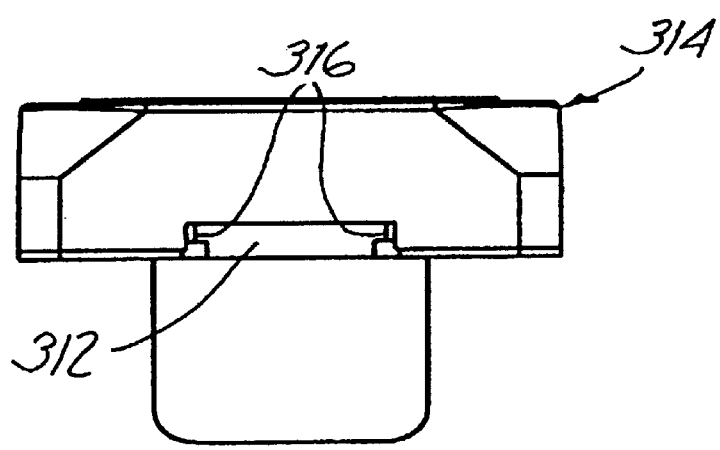
FIG. 20 is a rear plan view of a preferred battery assembly for engagement with the battery clasp of FIG. 19.

The edges 310 of the top portion 304 form rails for engaging with a corresponding "T" shaped opening 312 in a battery assembly 314 (see FIG. 20). The battery assembly 314 preferably has spring-loaded electrical contacts 316 for releasably engaging with the detents 308. The spring-loaded contacts 316 allow the battery assembly 314 to be slid on and off of the battery receiving structure 302. The electrical contacts 316 preferably have a flexing portions (not shown) similar to those disclosed in FIG. 9 which extend past the hinge 320 to the phone 100 (see also FIGS. 2 and 3). However, it will be understood that a variety of techniques may be used to electrically connect the battery assembly 314 with the phone 100, such as, for example, a shielded wire.

The process of exchanging a battery, known as lock-and-load, allows the user to quickly substitute a fresh battery as needed without terminating a call in progress. The user presses the Hold key 116 to signal to the base station 14 to suspend the call. The RF interface is terminated and the base station 14 holds the call for a programmed period of time. During this Hold period, the user may change batteries. With the battery replaced, the user reestablishes communication with the base station 14 by again pressing the Hold key 116. The RF link is reestablished and the call reconnected to the line. The PC board 160 preferably contains a series of capacitors which provide power to the control circuit to maintain the time of day while the user changes the battery assembly 130.

Figure 21:
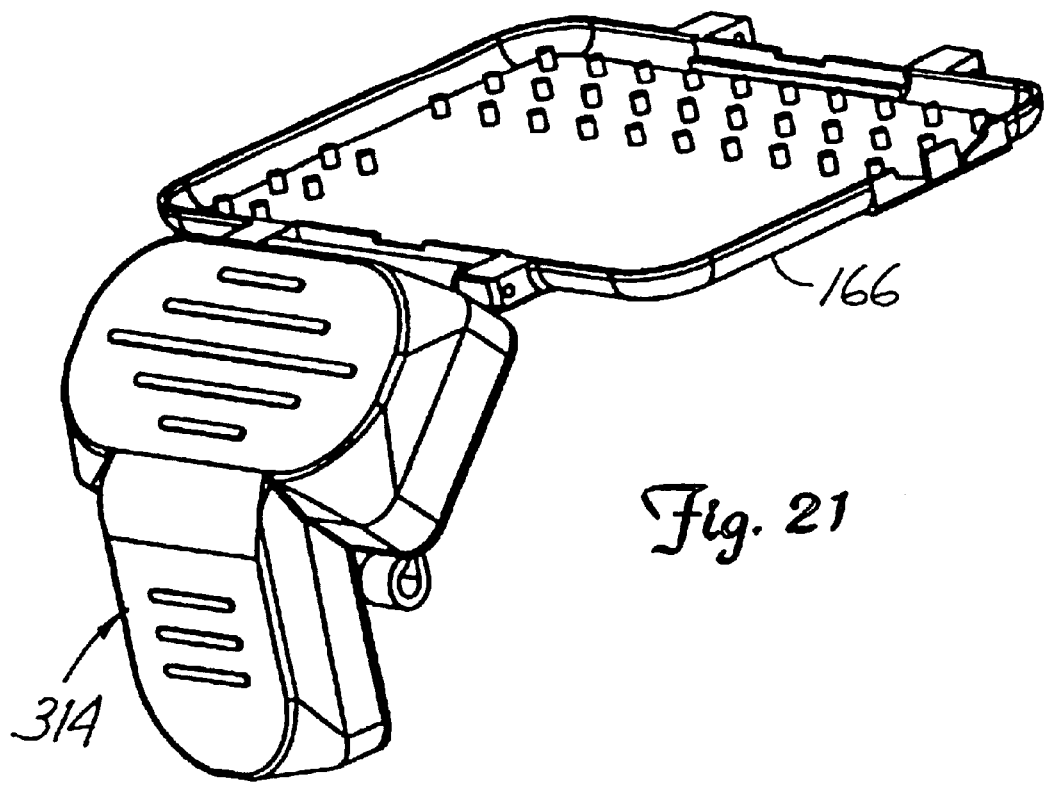
FIG. 21 is a perspective view of one preferred battery assembly engaged with the preferred battery clasp as attached to the base plate of the phone.
Figure 22:
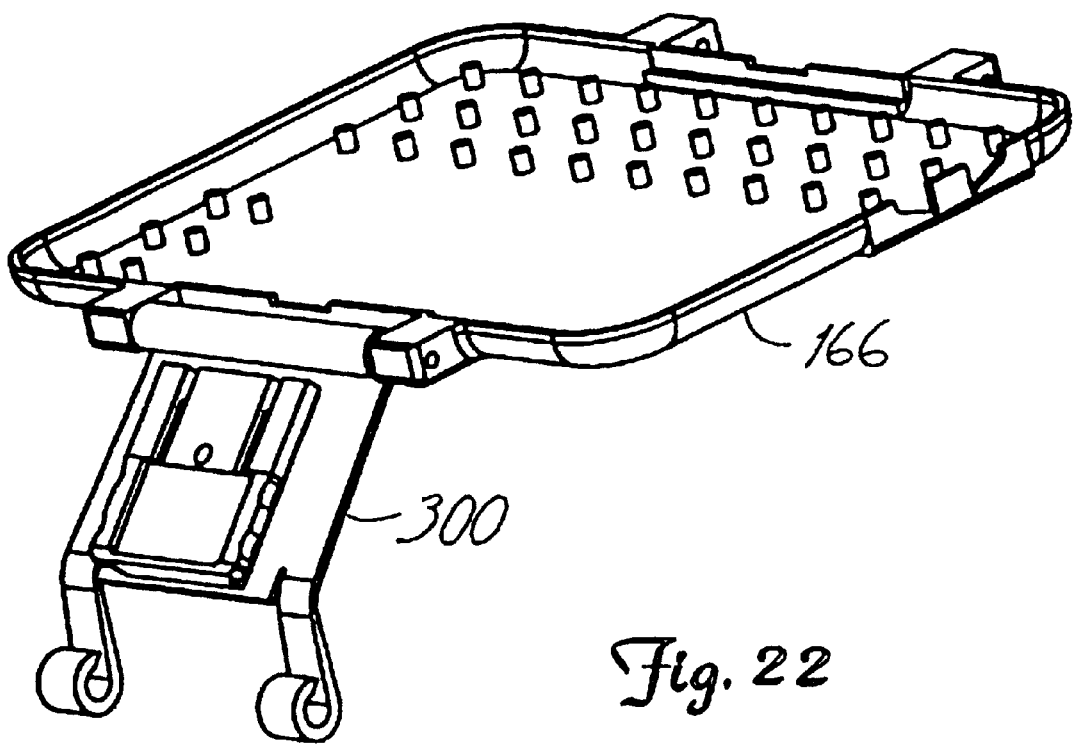
FIG. 22 is a perspective view of the preferred battery clasp attached to the base plate of the phone.

The clasp 300 has a hinge 320 for engagement with a corresponding hinge on 124 on the back plate 166 (see FIGS. 21 and 22). Additionally, a hinge 322 is provided on the opposite side of the clasp 300 for engagement with a wrist strap (not shown). Although the clasp 300 is generally configured for use with a wrist mounted phone, it will be understood that the present quick-release clasp 300 may be used with other configurations of the phone 100.

FIG. 22 illustrates the clasp 300 attached to the back plate 166. FIG. 21 illustrates one embodiment of the battery assembly 314 engaged with the clasp 300 of FIG. 22.

Figure 23:
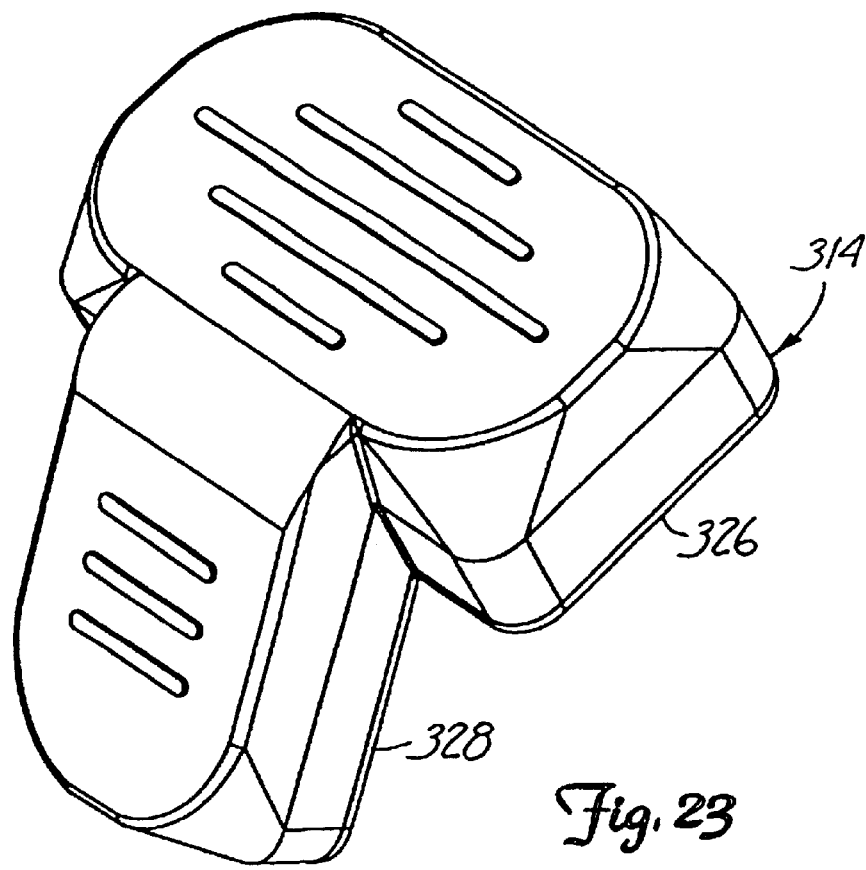
FIG. 23 is a perspective view of one embodiment of the preferred battery assembly.
Figure 24:
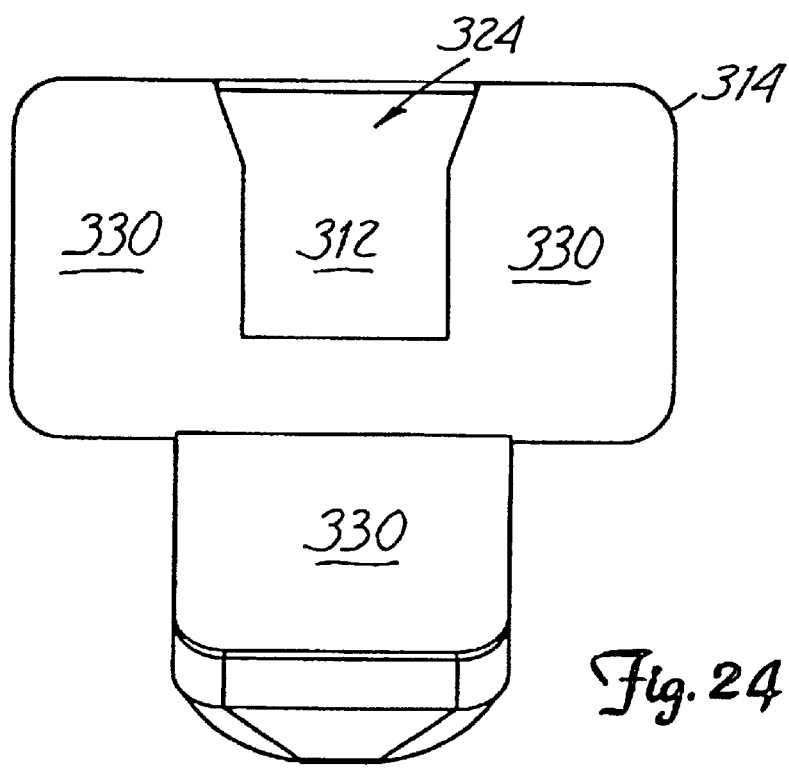
FIG. 24 is a bottom view of the battery assembly of FIG. 23.

FIG. 23 is a perspective view of one embodiment of the preferred battery assembly 314 having a primary portion 326 and a secondary portion 328. The secondary portion 328 is preferably shaped to follow the contour of a users wrist (see FIG. 21). FIG. 24 is a bottom view of the battery assembly 314 showing the "T" shaped opening 312 for engagement with the battery receiving structure 302. The opening 312 is preferably wider at the entrance 324 to facilitate engagement with the battery receiving structure 312. The battery assembly 314 preferably has three battery compartments 330.

Figure 25:
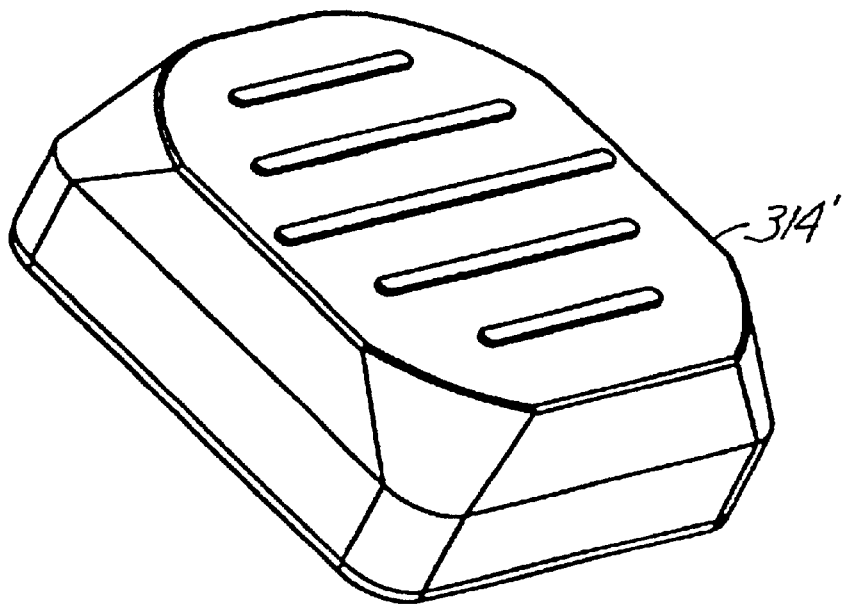
FIG. 25 is a perspective view of an alternate embodiment of the preferred battery assembly.
Figure 26:
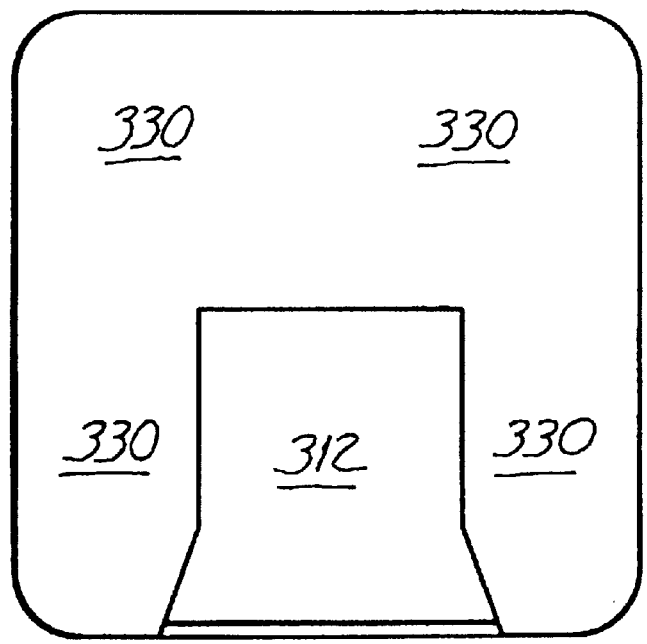
FIG. 26 is a bottom view of the battery assembly of FIG. 25.

FIG. 25 is a perspective view of an alternate preferred battery assembly 314' for engagement with the clasp 300. FIG. 26 is a bottom view of the battery assembly 314' showing the "T" shaped opening 312 for engagement with the battery receiving structure 302. The battery assembly 314' is designed to hold up to four batteries in the compartments 330'.

Figure 9:
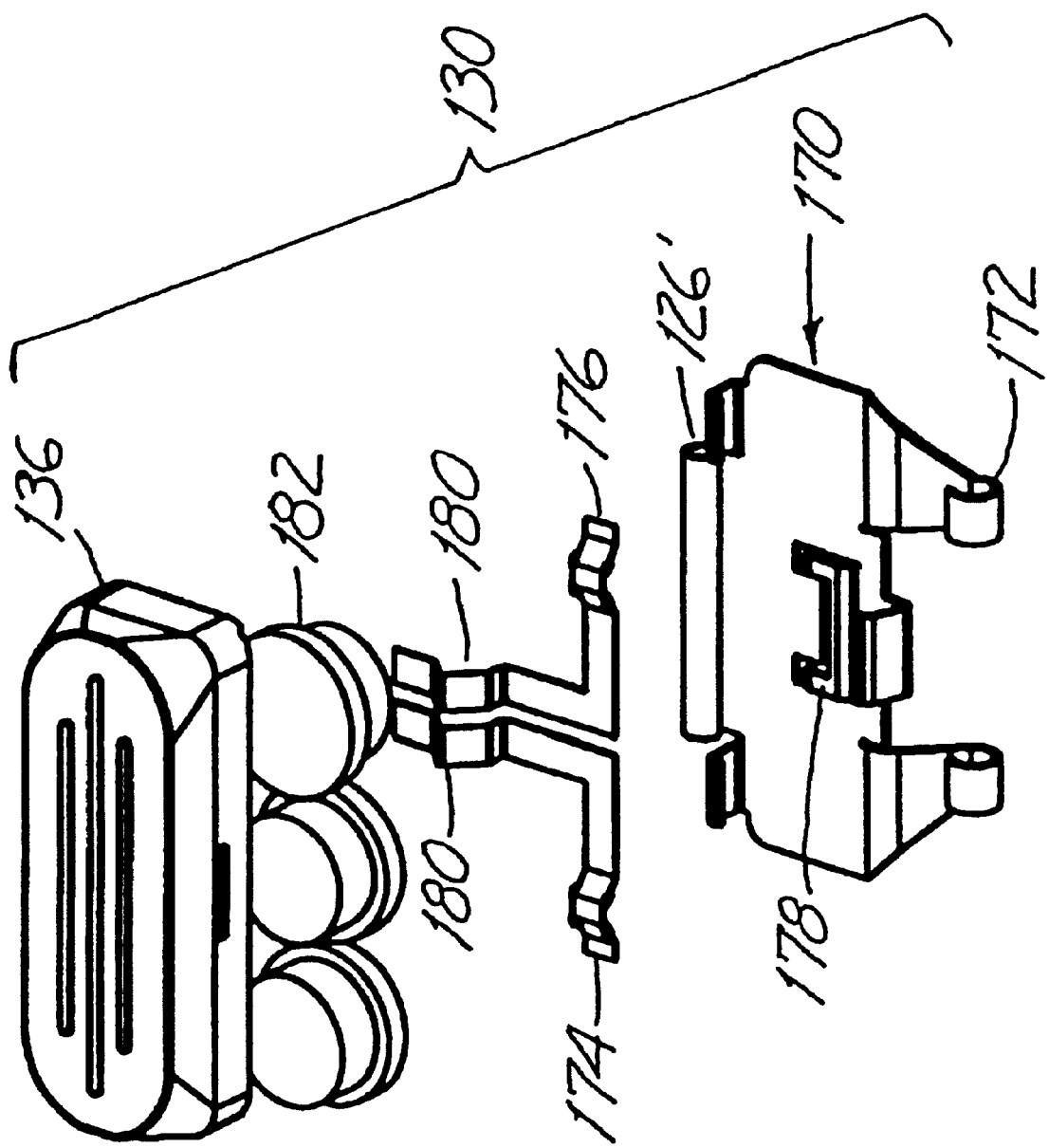
FIG. 9 is an exploded view of an alternate outboard battery assembly.

FIG. 9 is an exploded view of an alternate outboard battery assembly 130. Battery clasp 170 has a hinge 126' for connecting with the hinge 126 on the base plate 166. A second hinge 172 is provided for connecting to the wrist strap 132 (see FIG. 2). A pair of electrical contacts 174, 176 are attached to the battery clasp 170 by an electrical contact retaining member 178. The electrical contacts 174, 176 have a flex portions 180 which connects to a flex circuit (not shown) in the radio telephone 100. The flex portions 180 allows the battery assembly 130 to rotate on the hinge mechanism 126, 126' while maintaining a connection with the phone 100.

FIG. 9 illustrates an outboard battery assembly 130 with three batteries 182 contained in the housing 136. The batteries 182 preferably are common nickel metal hydride batteries which are low cost and readily available. However, it will be understood that a variety of batteries and battery configurations are possible and that the present invention is not limited in any way by the specific number or type of batteries 182 contained in the outboard battery assembly 130.

Figure 10:
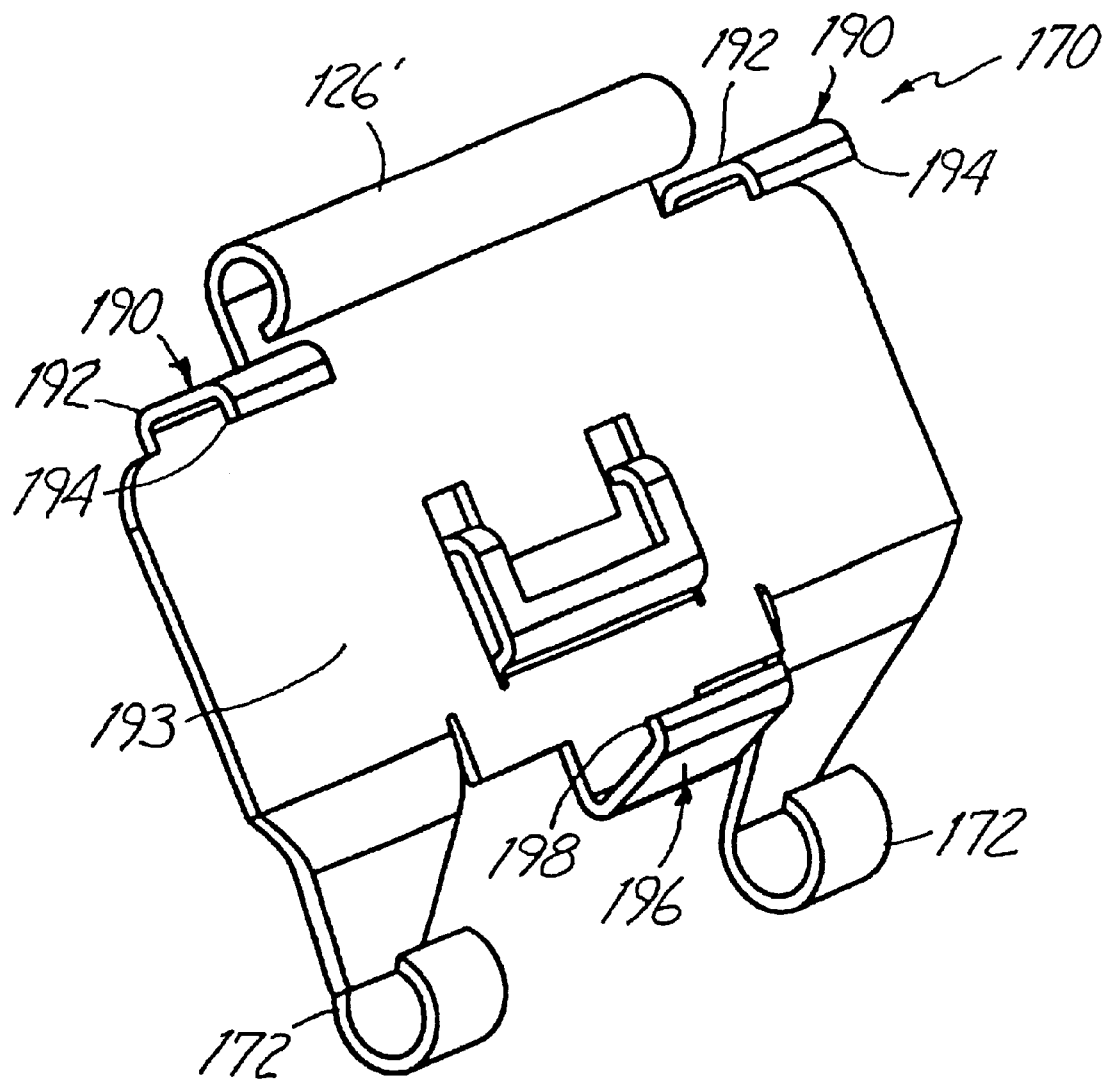
FIG. 10 is a perspective view of an alternate battery clasp.

FIG. 10 is a perspective view of the battery clasp 170 with a battery receiving surface 193. A pair of rear hook members 190 having body portions 192 and rear hook portions 194 are provided proximate the hinge 126'. Opposing front hook member 196 with a front hook portion 198 is provided proximate the hinge 172.

Figure 13:
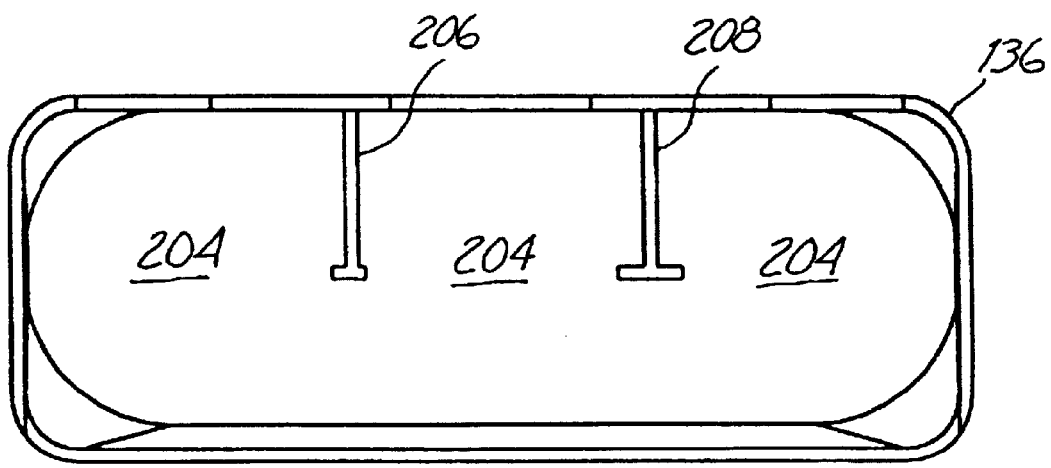
FIG. 13 is a bottom view of the alternate outboard battery assembly of FIG. 11.
Figure 11:
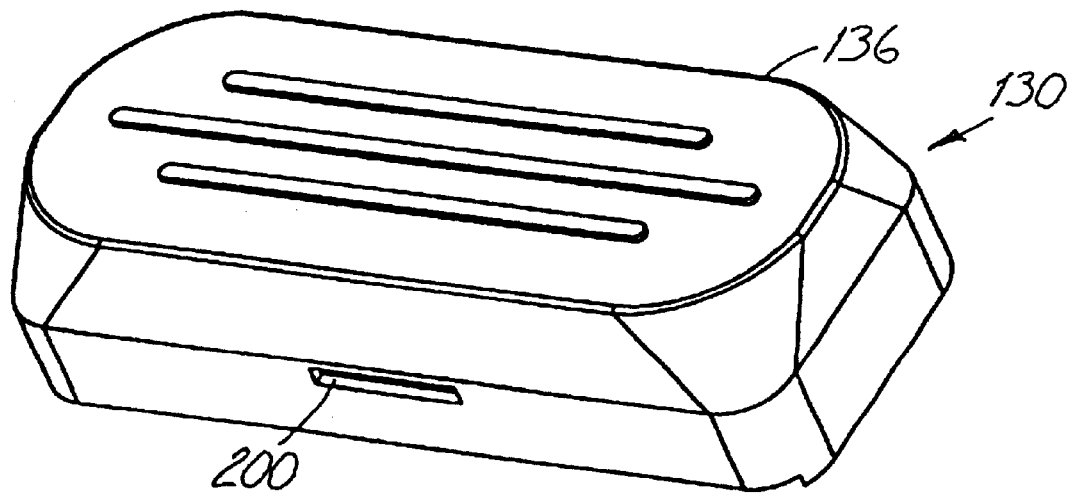
FIG. 11 is a perspective view of alternate outboard battery assembly.

FIG. 11 is a perspective view of the outboard battery assembly 130 illustrating a front receiving slot 200 in the battery housing 136. FIG. 12 is a rear view of the outboard battery assembly 130 showing rear receiving slots 202 in the housing 136. FIG. 13 is a bottom view of the battery housing 136 showing battery compartments 204 for retaining the batteries 182. A pair of dividers 206, 208 preferably are provided inside the battery housing 136 to maintain a separation between the batteries 182 and to orient the batteries 182 with respect to the electrical contacts 174, 176.

FIG. 14 is a side view of the alternate outboard battery assembly 130 engaged with the battery clasp 170. The front hook portion 198 and rear hook portions 190 preferably are biased inward towards the battery housing 136 so that they engage with the front receiving slot 200 and the rear receiving slots 202 (see FIG. 13). The battery clasp 170 preferably is constructed of a lightweight constructed material such as metal or plastic, which allows the front hook member 196 and rear hook members 190 to create a compressive retaining force on the battery housing 136.

To remove the outboard battery assembly 130 from the battery clasp 170, the user merely slides the battery housing 136 along the battery receiving surface 193 toward the front hook portion 198 of the front hook member 196. This movement releases the battery housing 136 from the rear hook portions 190, allowing the outboard battery assembly 130 to be tipped and removed from the battery clasp 170. Installation of a fresh battery assembly 130 is performed by reversing the above procedure. A call may be retained by the base station 14 as discussed above.

Figure 15:
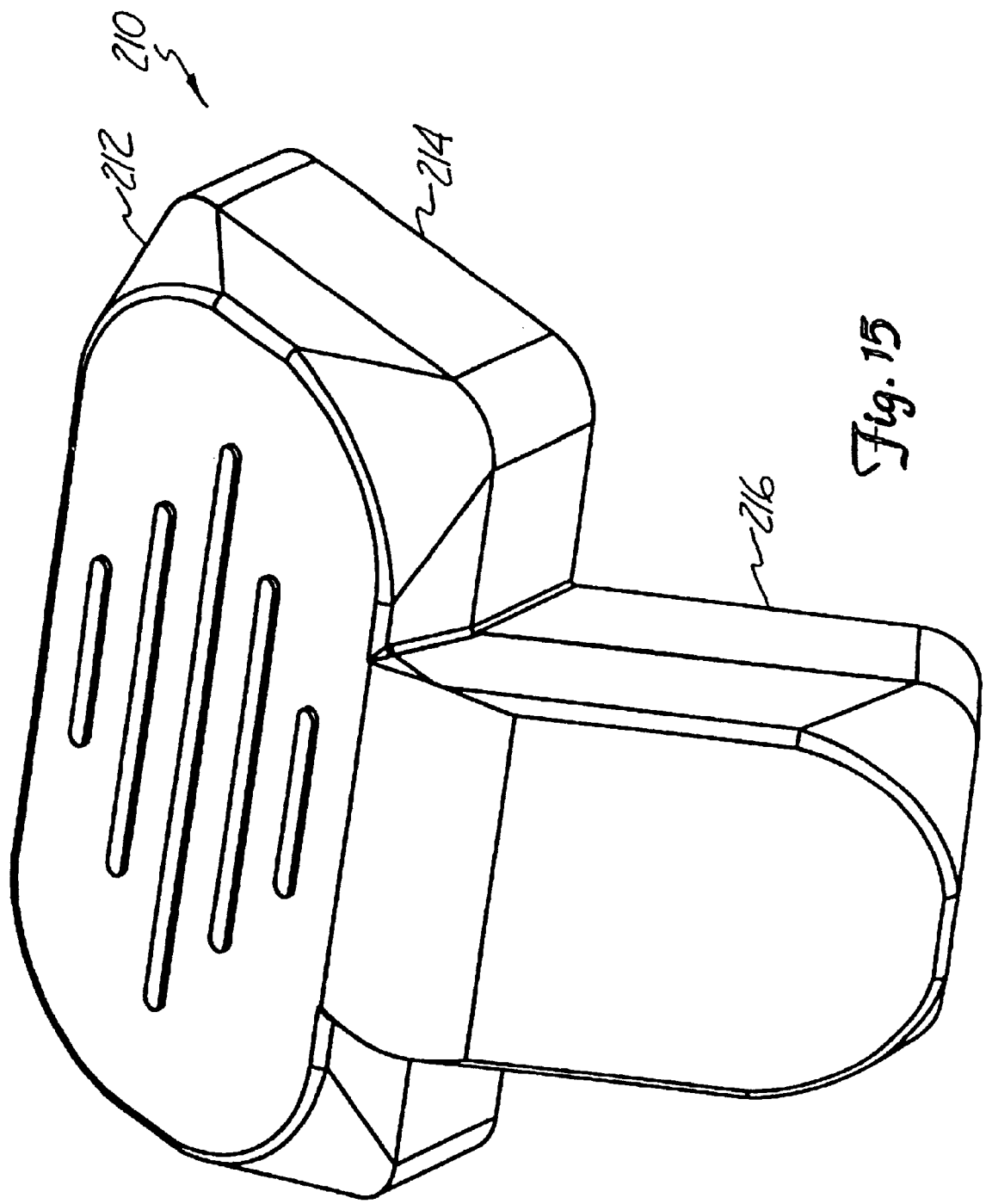
FIG. 15 is a perspective view of an alternate outboard battery assembly.
Figure 17:
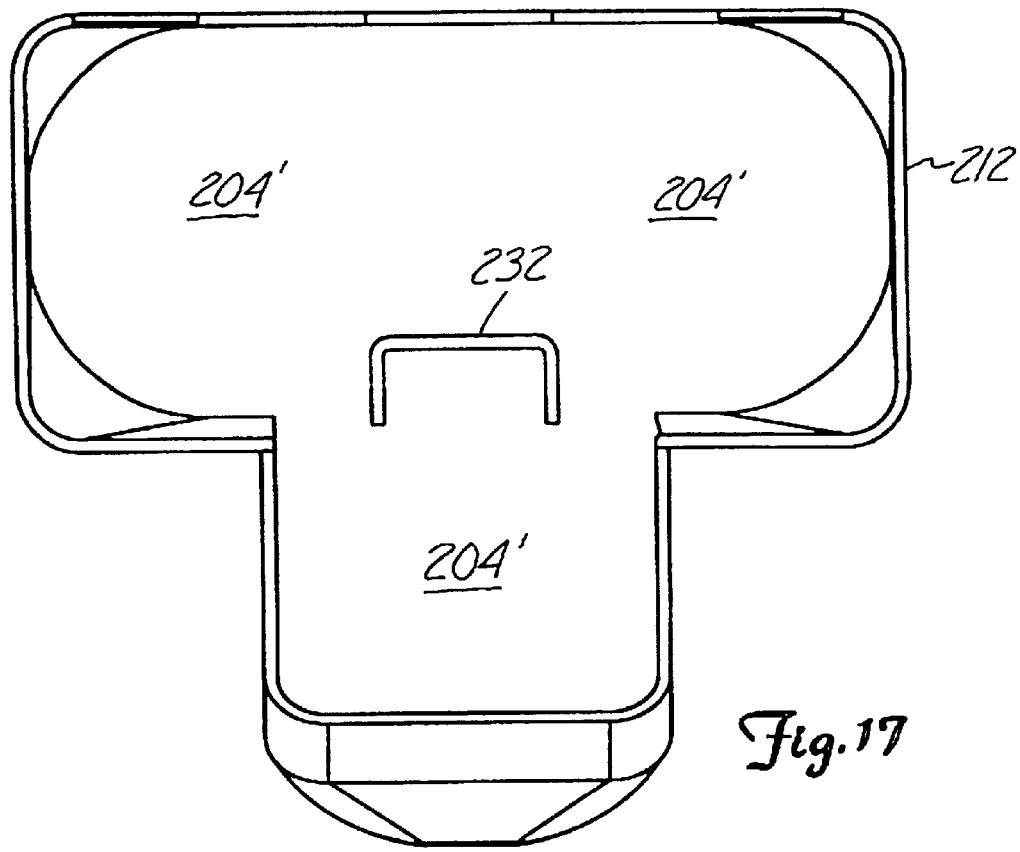
FIG. 17 is a bottom view of the alternate outboard battery assembly.
Figure 16:
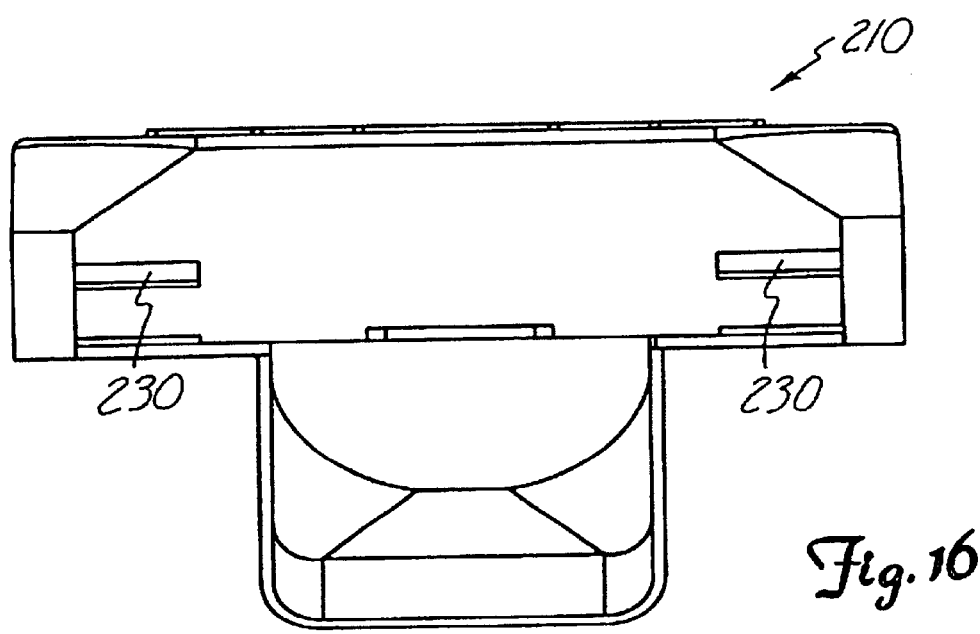
FIG. 16 is a rear view of the alternate outboard battery assembly attached to a battery clasp.

FIG. 15 is a perspective view of an alternate outboard battery assembly 210 in which the battery housing 212 has a primary portion 214 and a secondary portion 216. The secondary portion 216 provides additional space for holding battery elements (not shown). FIG. 16 is a rear view of the alternate outboard battery assembly 210 having a pair of rear receiving slots 230 for engaging with the rear hook members 224 on the battery clasp 220. FIG. 17 is a bottom view of the battery housing 212 showing a front hook engaging member 232 for engaging with the front hook 222 (see FIG. 18). The front hook engaging means 232 may also-operate as a divider between the battery compartments 204' for separating and orienting the batteries (not shown).

Figure 18:
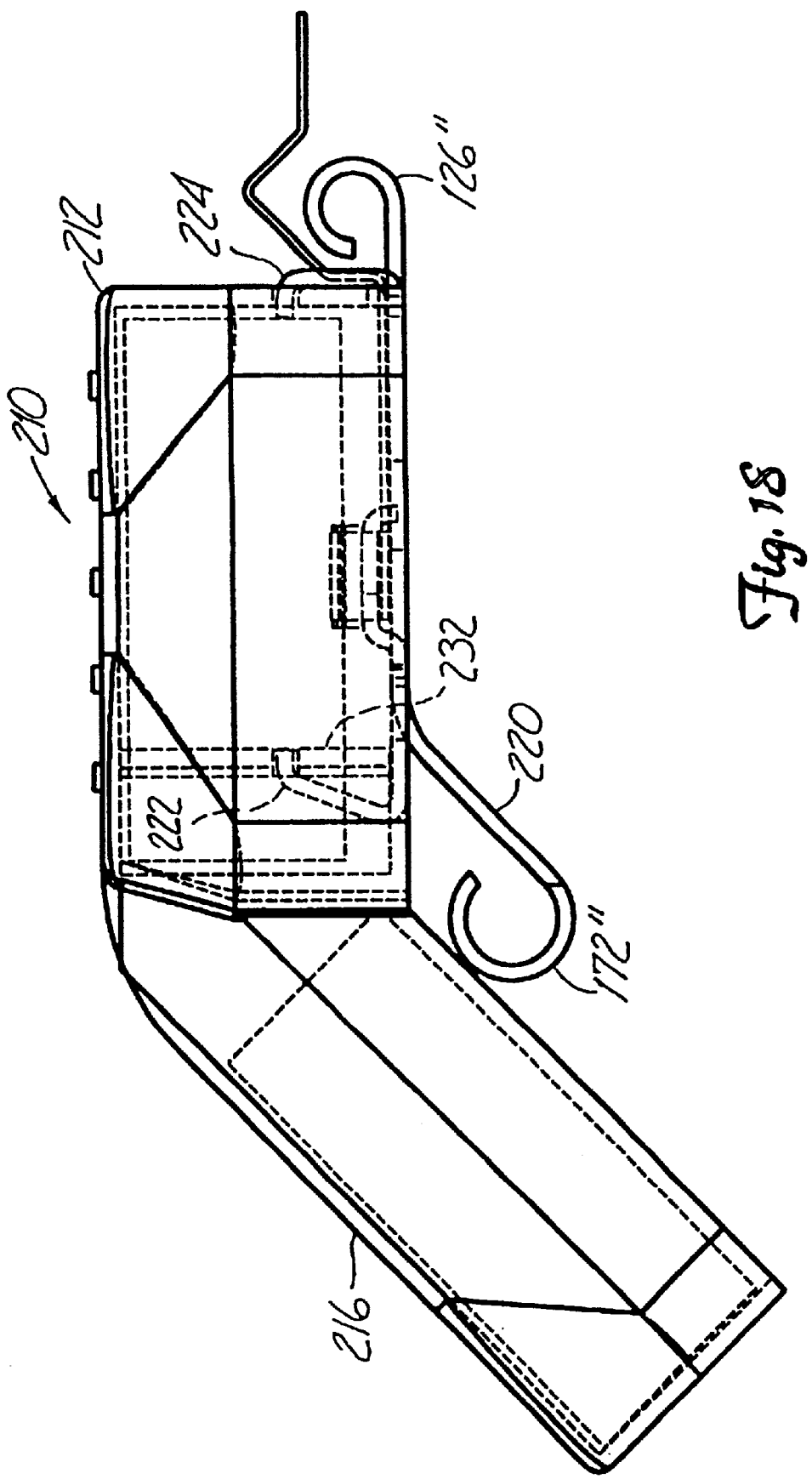
FIG. 18 is a side view of the alternate outboard battery assembly of the present invention.

FIG. 18 is a side view of the alternate outboard battery assembly 210 engaged with a battery clasp 220. The battery clasp 220 has a front hinge 126" for engaging with the compact wireless telephone 100 and a rear hinge 172 double prime for engaging with a wrist strap (not shown). The secondary portion 216 of the battery housing 212 is designed to generally follow the contour of the human wrist along the wrist strap (not shown). The battery clasp 220 has a front hook 222 and a pair of rear hooks 224 which are biased to create a compression force on the housing 212 so as to retain the alternate outboard battery assembly 210 to the clasp 220. The alternate battery assembly 210 is installed and removed in a similar manner to the battery assembly 130.

It is to be understood that the above description is intended to be illustrative, and not restrictive. Many other embodiments will be apparent to those of skill in the art upon reviewing the above description. Although the above inventions have been described in connection with a cordless telephone system, it should be apparent that the concepts extend to any cordless or cellular telephone application requiring a compact, portable telephone or speaker phone unit. The scope of the invention should, therefore, be determined with reference to the appended claims, along with the full scope of equivalents to which such claims are entitled.

What is claimed is:

1. A method of manufacturing a wireless telephone, comprising the steps of:

providing a directional speaker connected to a speaker interface circuit positioned for containment within a telephone body member and a directional microphone connected to a microphone interface circuit positioned for containment within the telephone body member, the telephone body member having a fixed configuration;

providing a wireless interface circuit positioned for containment within the telephone body member, and further providing a controller connected to the microphone interface circuit, the speaker interface circuit and the wireless interface circuit positioned for containment within the telephone body member;

positioning the directional speaker such that sound generated by the speaker radiates predominately in a first direction;

fixing the directional microphone such that the directional microphone is positioned so as to be most sensitive to sound arriving from a second direction approximately 90 degrees offset from the first direction; and encompassing the directional speaker, the directional speaker interface circuit, the directional microphone, the directional microphone interface circuit, the wireless interface circuit, and the controller within the telephone body member, wherein the wireless telephone is operable during non-communication and communication operations with the telephone body member in the fixed configuration.

2. The method of claim 1, wherein providing the directional speaker and directional microphone includes providing the directional microphone at a position that is located between approximately 2.5 cm and 6.8 cm from the directional speaker along at least one surface of the telephone body member.

3. The method of claim 1 wherein the telephone body member has at least two connected faces, one face being positioned at an angle of approximately 90 degrees with respect to the other face, the first direction being substantially perpendicular relative to one of the two faces and the second direction being substantially perpendicular to the other of the two faces.

4. The method of claim 3, wherein the telephone body member has a top face and a side face, the side face being positioned at an angle of approximately 90 degrees with respect to the top face, the first direction being substantially perpendicular relative to the top face and the second direction being substantially perpendicular to the side face.

5. The method of claim 4, wherein the directional speaker and directional microphone are positioned such that the first direction and second direction are in a nonintersecting relationship and separated by an offset distance, and further wherein the offset distance is at least an entire length of the top face.

6. The method of claim 1, wherein the telephone body member is configured to be worn on a user's wrist in the fixed configuration, and further wherein the wireless telephone is operable to receive communications and transmit communications without manipulation of the telephone body member into another configuration different than the fixed configuration and without removal from the user's wrist.

7. The method of claim 6, wherein the method further includes providing a keypad extending through the telephone body member to allow for programing the wireless telephone.

8. The method of claim 6, wherein the method further includes attaching at least one wrist strap to the telephone body member for retaining the wireless telephone on the user's wrist.

9. The method of claim 1, wherein the method further includes providing a base station, wherein providing a base station includes providing a telephone unit interface and a telephone line interface, and further wherein the method includes reducing gain of the microphone circuit of the wireless telephone to limit the amount of speaker sound fed back to the base station.

10. The method of claim 9, wherein the method further includes reducing sidetone in the telephone line interface.

* * * * *